United States Patent
McLoughlin

(10) Patent No.: US 11,863,357 B2
(45) Date of Patent: Jan. 2, 2024

(54) COMMUNICATION LINK RE-TRAINING

(71) Applicant: Intel Corporation, Santa Clara, CA (US)

(72) Inventor: Bruce McLoughlin, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 337 days.

(21) Appl. No.: 17/022,637

(22) Filed: Sep. 16, 2020

(65) Prior Publication Data

US 2020/0412586 A1    Dec. 31, 2020

Related U.S. Application Data

(60) Provisional application No. 62/941,949, filed on Nov. 29, 2019, provisional application No. 62/941,985, filed on Nov. 29, 2019.

(51) Int. Cl.
*H04L 25/03* (2006.01)
*G06F 13/42* (2006.01)
(Continued)

(52) U.S. Cl.
CPC .... *H04L 25/03878* (2013.01); *G06F 13/4282* (2013.01); *H04B 10/0731* (2013.01); *H04B 10/0775* (2013.01); *H04B 10/40* (2013.01)

(58) Field of Classification Search
CPC .......... H04L 25/03878; H04B 10/0731; H04B 10/0775; H04B 10/40; G06F 13/4282
See application file for complete search history.

(56) References Cited

U.S. PATENT DOCUMENTS 8,902,964 B2 * 12/2014 Aguilar-Arreola ..... H04L 25/14
                                                            375/232
9,252,968 B2 *  2/2016 Lusted .................. H04L 12/413
(Continued)

FOREIGN PATENT DOCUMENTS

WO       2013191912 A1    12/2013

OTHER PUBLICATIONS

International Search Report and Written Opinion for PCT Patent Application No. PCT/US20/52892, dated Jan. 8, 2021, 12 pages.
(Continued)

*Primary Examiner* — James M Perez
(74) *Attorney, Agent, or Firm* — Essential Patents Group, LLP; Christopher K. Gagne

(57) ABSTRACT

Examples described herein relate to determining whether a device can re-train settings of one or more components of another device. Some examples include conducting link re-training by: receiving, by a receiver in a first device, signals over a lane from a transmitter in a second device, the signals comprising a first communication identifying capability to re-train a link; transmitting, from the first device, a second communication including one or more components of a second device with capability to be adjusted and a request to modify one or more parameters of the one or more components; and receiving, at the first device, a third communication identifying a status of re-training. In some examples, the one or more components comprise an equalizer and the one or more parameters comprises at least one tap setting. In some examples, the one or more parameters comprise a precursor, main cursor or post-cursor equalization setting.

22 Claims, 15 Drawing Sheets

(51) Int. Cl.
H04B 10/073 (2013.01)
H04B 10/077 (2013.01)
H04B 10/40 (2013.01)

(56) References Cited

U.S. PATENT DOCUMENTS

| | | | | |
|---|---|---|---|---|
| 9,513,662 | B2* | 12/2016 | Chin | G06F 13/4282 |
| 9,575,922 | B2* | 2/2017 | Desimone | H04L 25/03885 |
| 9,608,865 | B2* | 3/2017 | McLoughlin | H04L 41/083 |
| 10,148,508 | B1* | 12/2018 | Sedarat | H04L 12/413 |
| 10,666,468 | B2* | 5/2020 | Gao | H04Q 11/0067 |
| 10,868,580 | B1* | 12/2020 | Razavi Majomard | H04B 3/32 |
| 10,880,137 | B2* | 12/2020 | Das Sharma | H04L 27/01 |
| 11,005,692 | B2* | 5/2021 | Das Sharma | H04L 27/01 |
| 11,228,340 | B1* | 1/2022 | Lim | H04B 3/487 |
| 11,356,306 | B2* | 6/2022 | Shah | H04L 43/04 |
| 11,397,701 | B2* | 7/2022 | Das Sharma | G06F 13/4295 |
| 2005/0201454 | A1* | 9/2005 | Chaudhuri | H04L 25/03343 375/229 |
| 2006/0291500 | A1* | 12/2006 | Kroninger | H04L 12/2896 370/465 |
| 2007/0208894 | A1* | 9/2007 | Curry | G06F 13/387 710/105 |
| 2009/0097390 | A1* | 4/2009 | Diab | H04L 5/0007 370/201 |
| 2010/0169523 | A1* | 7/2010 | Dunstan | G06F 13/385 710/104 |
| 2013/0067127 | A1* | 3/2013 | Hopgood | G06F 13/4282 710/104 |
| 2013/0343400 | A1* | 12/2013 | Lusted | H04L 12/413 375/295 |
| 2014/0032799 | A1* | 1/2014 | Dickson | G06F 13/24 710/104 |
| 2014/0082251 | A1* | 3/2014 | Li | G06F 13/4282 710/316 |
| 2014/0092952 | A1* | 4/2014 | Aguilar-Arreola | H04L 25/03878 375/233 |
| 2014/0108697 | A1* | 4/2014 | Wagh | G06F 13/385 710/313 |
| 2014/0208146 | A1* | 7/2014 | Lusted | H04L 1/0072 713/400 |
| 2015/0186201 | A1* | 7/2015 | Ran | H04L 1/0083 714/4.5 |
| 2015/0370683 | A1* | 12/2015 | Nishiyama | G06F 11/3419 714/43 |
| 2016/0007218 | A1* | 1/2016 | Bhagavatula | H04W 24/08 455/67.11 |
| 2016/0013978 | A1* | 1/2016 | McLoughlin | H04L 25/14 709/221 |
| 2017/0346596 | A1* | 11/2017 | Desimone | H04L 25/03885 |
| 2018/0331864 | A1* | 11/2018 | Das Sharma | H04L 25/03 |
| 2019/0042507 | A1* | 2/2019 | Venkatesan | H04L 25/08 |
| 2019/0123941 | A1* | 4/2019 | Gao | H04L 25/03019 |
| 2019/0258600 | A1* | 8/2019 | Das Sharma | G06F 11/0778 |
| 2020/0226084 | A1* | 7/2020 | Das Sharma | H04L 45/24 |
| 2020/0259936 | A1* | 8/2020 | Lusted | H04L 69/324 |
| 2020/0341924 | A1* | 10/2020 | Lambert | G06F 13/409 |
| 2020/0412586 | A1* | 12/2020 | McLoughlin | H04B 10/0775 |
| 2021/0006330 | A1* | 1/2021 | McLoughlin | H04B 10/0731 |
| 2021/0075647 | A1* | 3/2021 | Li | G06F 13/385 |
| 2021/0119835 | A1* | 4/2021 | Levin | H04L 25/03885 |
| 2021/0238992 | A1* | 8/2021 | Zeng | H04L 5/006 |
| 2022/0137848 | A1* | 5/2022 | Lim | G06F 3/0613 711/154 |
| 2022/0302943 | A1* | 9/2022 | Bandi | H04L 25/03318 |
| 2022/0342841 | A1* | 10/2022 | Choudhary | G06F 13/4221 |
| 2023/0010016 | A1* | 1/2023 | Chang | H04L 25/03343 |

OTHER PUBLICATIONS

"IEEE Standard for Ethernet Amendment 3: Media Access Control Parameters for 50 GB/s and Physical Layers and Management Parameters for 50 GB/s, 100 GB/s, and 200 GB/s Operation", IEEE Computer Society, Sponsored by theLAN/MAN Standards Committee, Approved Dec. 5, 2018, 401 pages.

IEEE P802.3ck™/D1.1 Draft Standard for Ethernet Amendment: Standard for Ethernet Amendment: Physical Layer Specifications and Management Parameters for 100 GB/s, 200 GB/s, and 400 GB/s Electrical Interfaces Based on 100 GB/s Signaling, IEEE Computer Society, LAN/MAN Standards Committee, IEEE P802.3ck™/D1.1, Feb. 10, 2020, 266 pages.

Lapak, Jeff, "Clause 28 & 40 Auto Auto-Negotiation an introduction to the Auto-Negotiation process", © University of New Hampshire Interoperability Laboratory, Apr. 28, 2005, 98 pages.

* cited by examiner

| D0_3 | D4_10 | D11 | D12 | D13 | D14 | D15 | D16_26 | D27_31 | D32_42 | D43_47 |
|---|---|---|---|---|---|---|---|---|---|---|
| 0001 | 0000000 | T | 0 | 1 | ACK | 1 | Vendor OUI[23:13] | 00000 | Vendor OUI[12:2] | 00000 |

FIG. 3A

| D0_3 | D4_8 | D9_10 | D11 | D12_13 | D14 | D15 | D16_47 |
|---|---|---|---|---|---|---|---|
| 0001 | 00000 | Vendor OUI[1:0] | T | 00 | ACK | NP | Time_in_ms |

FIG. 3B

COMMUNICATION LINK RE-TRAINING

RELATED APPLICATIONS

This application claims the benefit of priority of U.S. Provisional applications 62/941,949 and 62/941,985, both filed Nov. 29, 2019. The contents of those applications are incorporated in their entirety herein.

DESCRIPTION

An optical module is a hot-pluggable optical transceiver that is used in high-bandwidth data communications applications. The optical module typically has an electrical connection to a chip (for example, a host application specific integrated circuit (ASIC)). This electrical connection is a high data rate serial link (referred to as xGAUI-n where AUI stands for Attachment Unit Interface, x is the data rate per lane in Giga bits per second (Gbps), and n is the number of lanes), with current rates of 50 Gb/s per lane (50GAUI-1). 50GAUI-1 is a one lane serial link used for chip-to-chip or chip-to-module interconnections. However, an optical module is merely one example of a device that uses a serial link. An electrical signal receiving and processing module can also use a serial link.

Serial communication between a transmitter and a receiver at very high data rates uses equalization to mitigate frequency dependent signal attenuation. Equalization can be applied at the transmitter (Tx) and/or at the receiver (Rx). Typically, a combination of transmitter and receiver equalization is used.

BRIEF DESCRIPTION OF THE DRAWINGS

FIG. 3A depicts an example contents of fields of a next page.

FIG. 3B shows an example second next page format.

DETAILED DESCRIPTION

Figure 1:
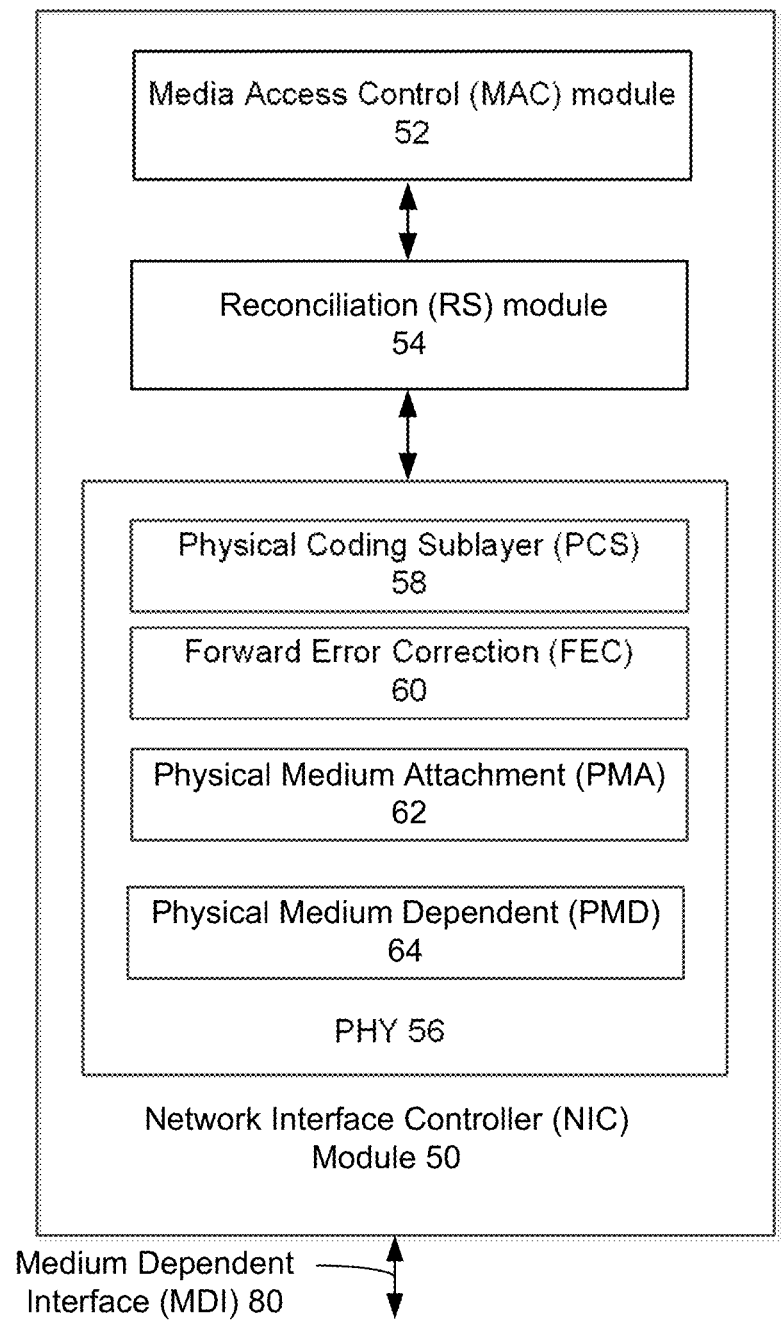
FIG. 1 depicts an example system.

Among network-connected devices, for devices to communicate with each other, common communications capabilities and parameters are discovered. Auto-negotiation (AN) is a process whereby end points of a link share information on various capabilities relevant to their communication. For an example of AN, see Clause 73 of Institute of Electrical and Electronics Engineers (IEEE) 802.3-2018. Link partner devices exchange abilities and modes of operation via the exchange of base pages and, if requested, the link partner devices exchange next pages. According to Clause 73 of IEEE 802.3-2018, each device sends a list of its data-rate capabilities to its link partner. Auto-negotiation can determine the highest common capability and the highest common capabilities are used for communication between the link partner devices. After both devices receive their link partner's capability list, the devices can transition to the highest common data rate and feature capabilities.

Link training is a process used by a device connected through a copper cable, backplane, or other wired or wireless signal transmission media by which the transmitter and receiver on a high-speed serial link communicate with each other in order to tune their equalization settings. For example, serializers/deserializers (SerDes) can use link training. Link training enables tuning of the finite impulse response (FIR) filter for each channel in an application-specific integrated circuit (ASIC) or other device to achieve the desired bit error rate (BER), eye size, signal-to-noise ratio (SNR), eye size, or link errors (e.g., uncorrectable and correctable forward error correction (FEC) errors, pseudo-random bit sequence (PRBS) errors, physical coding sublayer (PCS) errors). In some examples, the receiver examines the eye after applying equalization to the signal and determines if eye height and/or eye width is acceptable. The receiver can make a decision to terminate link training because the eye is acceptable, or keep training to optimize the eye further. If the receiver requests that its link partner transmitter change the precursor, main cursor or post-cursor equalization setting, the eye examination process begins again.

As a link partners both include a transmitter and receiver, a link partner can simultaneously train the other partner's transmitter. After the link is trained, the two devices begin sending normal data traffic using the optimized transmitter settings.

The Ethernet (IEEE 802.3) standards for 10 Gb/s and above over backplane and copper cables include a PMD (Physical Media Dependent) control function that enables adjusting the transmitter equalization settings as part of the link training. The PMD control function uses a handshake-based protocol for requesting coefficient changes. The protocol is described by state diagrams (e.g., FIGS. 72-4, 72-5 and 72-6 in IEEE Std 802.3-2012 and variations thereof). Those state diagrams are referenced in approved and draft standards for multiple PMDs (e.g., 10GBASE-KR, 40 GB ASE-KR4, 40 GB ASE-CR4, and 100 GB ASE-CR10).

IEEE 802.3-2018 clause 73 and subclauses 73.7.4 and 73.7.5 and table 73-7 set forth that a device under test will defer for the proper amount of time before attempting to verify the status of the link determined by the Auto-Negotiation process. IEEE 802.3-2018 clauses 72 and 73 specify suitable link training times. A link fails if the link_fail_inhibit_timer has expired before link is active (e.g., signal is being properly decoded). However, in some cases, the amount of time set by link_fail_inhibit_timer may be insufficient to achieve a desired Bit Error Rate (BER) on the link resulting in more errors during normal operation (e.g., fewer Cyclic Redundancy Check (CRC) errors).

Reference to any standard herein refers to any version including prior versions, current and future versions as well as proprietary derivatives thereof.

Various embodiments attempt to improve link quality that use auto-negotiation at least in cases where the IEEE defined link training time may not allow for optimal training. IEEE 802.3 proposes negotiation using a next page exchange phase. For an example of next page messages, see Annex 28C of IEEE 802.3-2018. In some examples, next pages can be used to exchange identifier tags, Energy Efficient Ethernet (EEE) parameters, operating parameters and vendor specific information. According to various embodiments, one or both link partners can use a next-page exchange during auto-negotiation to advertise capability to extend link training time and an amount of time a link partner can extend link training time. In some examples, link partners can advertise one or more amounts of time that link training time can be extended. Link partners can negotiate how much to extend "the link_fail_inhibit_timer" to set an amount of time for link training. In some examples, if both sides advertise ability to do this, then the highest common denominator of two extension times is used and added to the link-fail inhibit time to determine a total amount of link-fail inhibit time permitted. However, if a link partner indicates extending link-fail inhibit time is not supported, then the default inhibit time is used (e.g., IEEE 802.3 default link_fail_inhibit_timer).

Various embodiments can be used for link training or link re-training among chip-to-chip over traces of backplane connections (e.g., 10 GBASE-KRx or derivatives thereof (where x is an integer)) or network interface-to-network interface connections through copper cable (e.g., 40GBASE-CR4 or derivatives thereof). Various embodiments can be applied to link or lane speeds at or above 10 Gbps, or any link or lane speed.

Various embodiments provide a manner for partners or ports to agree to extend the IEEE defined link-training time allowing for more optimal equalizer tuning. Receipt of a proprietary "next page" can represent, among other reasons, a request by a link partner to extend the subsequent link-training phase by a specified time. The maximum amount of time to allow for extending link-training can be specified in a field of the next page. For example, the value in the field represents the additional time, over the IEEE defined maximum time, to allow.

Many SerDes have trouble achieving good Rx equalization (e.g., eye quality, signal integrity) in a time allotted under IEEE 802.3. Extending the link-fail inhibit time can allow for more time for link-training to improve the link. By extending the link training time the Bit Error Rate (BER) on the link can be minimized resulting in fewer errors during normal operation (e.g., fewer CRC errors).

Link training is applicable to other wired communications or networking systems such as but not limited to FibreChannel, InfiniBand, or Serial Attached Small Computer System Interface (SAS). Extending link training time can be useful for 4-level pulse amplitude modulation (PAM) links (e.g., PAM4 links), PAM4, PAM5, PAM6, n-level PAM links (where n is an integer), non-return-to-zero (NRZ) line code, and so forth.

Various embodiments provide a protocol that may be invoked at any time after the establishment of a point-to-point link. Various embodiments provide at least for allowing tuning to continue after a link is established. Various embodiments can be used to extend the tuning of a link beyond the time allowed by IEEE 802.3 for link-training following auto-negotiation. In some cases, the protocol can be used after the link is established to modify the transmit (Tx) equalization on both sides of the link. Some embodiments provide a capability to request a link-partner to make changes to the link-partner's transmit settings to optimize the local receiver. Link tuning may be desirable for a variety of reasons such as changed conditions (e.g., power, voltage, temperature changes), periodic change, and other reasons. Various embodiments can provide an extended link-training after a link is up, whether brought up using AN or not. The extended link-training can allow tuning of the link-partner transmit equalization settings as well as local receiver equalization resulting in potentially improved tuning. The link-training can take place from the receiver's perspective, so the transmitter settings are being requested to change. In some examples, data can be transmitted while training is occurring and a training data pattern can be used during re-training. During link re-training, a transition density signal or different separate training data can be used.

Various embodiments can use a link layer discovery protocol (LLDP) type-length-values (TLVs) to request incremental changes to a link partner's transmit equalization settings (e.g., pre, main, post). However, LLDP protocol and TLV format are not required and any type of message can be used. For example, a packet header can be used to convey transmitter or receiver equalizer settings. For example, various embodiments could use a user datagram protocol (UDP) packet exchange to enable and use extended link-training. Extended link training, in combination with a quality metric for the local receiver equalization, can be used to improve link quality (e.g., lower Bit Error Rate (BER)) and reduce link errors (e.g., forward error correction (FEC) or PCS) identified at the receiver over receive side-only optimization. Extended link training or re-training can be used to extend the tuning of a link beyond the time allowed by IEEE 802.3 (or other standards or specifications) for link-training.

According to some embodiments, an LLDP compatible message can be used by an initiator device to communicate or request a partner device to determine or check if received signal characteristics have drifted or the signal quality is acceptable and to trigger the initiator device or the partner device to perform re-training. For example, according to some embodiments, a temperature change at a base station or edge or fog computing device or any type of device (e.g., heat of day or cold of night or day) can trigger retraining of equalizer settings.

For example, link training time extension and re-training can be applied by a base station that supports communications using wired or wireless protocols (e.g., 3GPP Long Term Evolution (LTE) (4G) or 3GPP 5G), on-premises data centers, off-premises data centers, edge network elements (computing elements provided physically closer to a base station or network access point than a data center), fog network elements (computing elements provided physically closer to a base station or network access point than a data center but further from an edge network), and/or hybrid data centers (e.g., a data center that uses virtualization, cloud and software-defined networking to deliver application workloads across physical data centers and distributed multi-cloud environments). Network or computing elements can be used in local area network (LAN), metropolitan area network (MAN), network with devices connected using optical fiber links, campus area network (CAN), or wide area network (WAN).

Various embodiments can be used with 50G SerDes speeds and above, although lower speeds can be supported.

FIG. 1 is a block diagram illustrating Ethernet port circuitry in a network interface controller 50. The Ethernet port logic includes a Media Access Control (MAC) module 52, a reconciliation sublayer module 54 and a PHY module 56. The PHY module 56 can include a physical medium attachment (PMA) sublayer module 62, Physical Medium Dependent (PMD) sublayer 64, a forward error correction (FEC) module 60 and a physical coding sublayer (PCS) module 58.

MAC module 52 is configured to transfer data to and from the PHY module 56. The Reconciliation Sublayer (RS) module 54 can provide a mapping operation that reconciles the signals at a Media Independent Interface (MII) to the Media Access Control (MAC)-Physical Signaling Sublayer (PLS) service definitions. MAC module 52 can be configured to implement aspects of the MAC layer operations and the RS module 54 can be configured to implement reconciliation sublayer operations.

The Physical Medium Dependent (PMD) sublayer 64 can be responsible for interfacing to transmission medium, Medium Dependent Interface (MDI) 80. The Physical Medium Attachment (PMA) sublayer 62 can perform transmission, reception, signal detection, clock recovery and skew alignment. PMD 64 and PMA 62 can be configured to transmit and receive serial data over the MDI 80.

In some examples, PMD 64, PMA 62a and/or 62b can include or use a SerDes. In some examples, extended link training and re-training can be provided to adjust filter parameters of a transmit and/or receive equalizer used by a SerDes. For example, a Software SerDes driver executed by a processor in a host or a network interface can be used to change a transmit equalizer parameter. In some examples, any combination of hardware, software and/or firmware can be used to manage and perform link training and/or link re-training.

In some examples (e.g., for 100GBASE-CR1 or 100GBASE-KR1), FEC module 60 may decode data passed from the PMD 64 and PMA 62 to the PCS module 58 or encode data passed from the PCS module 58 to the PMD 64 and PMA 62a, 62b. In some examples, (e.g., for 200G and 400G modes), PCS module 58 includes FEC module 60. Forward error correction code may improve the reliability of data transmission at higher line speeds.

In the transmit direction, MAC module 52 can receive data to be transmitted in a media access control (MAC) frame over MDI 80, and generates the MAC frame that includes inter-packet gap (IPG), preamble, start of frame delimiter (SFD), padding, and Cyclic Redundancy Check (CRC) bits in addition to the received data before passing the MAC frame to the PHY module 56. The PHY module 56 can encode the MAC frame for reliable serial transmission over the MDI 80.

In the receive direction, MAC module 52 can receive MAC frames over a data bus from PHY module 56. MAC module 52 can accept MAC frames from PHY 56, perform Ethernet frame detection and validation, cyclic redundancy check (CRC) validation, update statistics counters, strip out the CRC, preamble detection and removal, and start of frame delimiter (SFD) detection and removal, and forward the rest of the MAC frame that includes headers for other protocols to a next layer (for example, an Internet protocol (IP) layer) for processing.

Figure 2A:
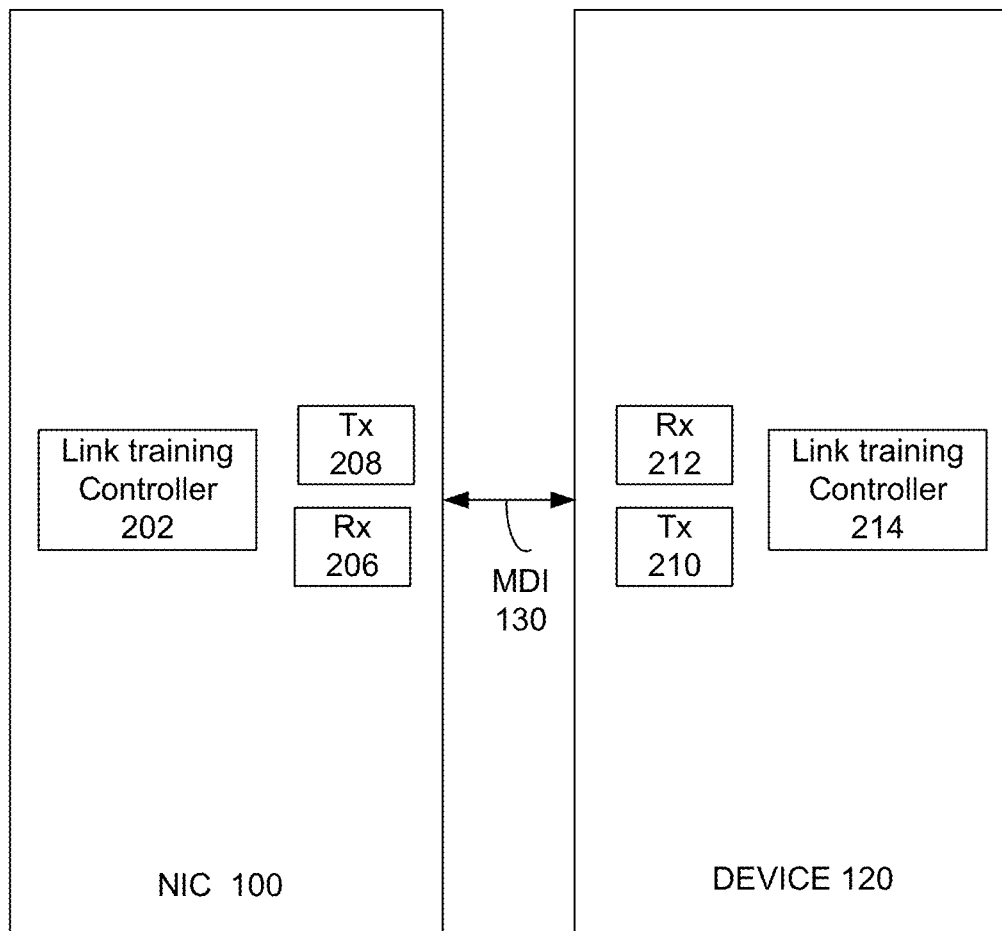
FIGS. 2A-2B depict example systems.

FIG. 2A illustrates a simplified example of a transmitter-receiver pair for between a network interface controller 100 and a device 120. MDI 130 provides a link between network interface controller 100 and device 120 by transferring data in parallel over one or more lanes. Device 120 can be any device such as another network interface, network interface card (NIC), a switch, router, a server, a host computing platform, and so forth.

Network interface controller 100 can include a host receiver 206 and a host transmitter 208 for at least one lane of an electrical link between the network interface controller 100 and device 120. Device 120 can include a module receiver 212 and module transmitter 210 for an electrical link between network interface controller 100 and device 120.

For example, link training controller 202 of NIC 100 can be used to advertise and negotiate extensions to link training time with link training controller of module 120 or vice versa. Link training controller 202 can also initiate or manage link re-training operations as described herein. Link training controller can be implemented as a driver, microcontroller, or other software in a host or network interface.

Transmitter (Tx) 208/210 or receiver (Rx) 206/212 can use a SerDes to serialize or deserialize a signal. When a SerDes is turned on and a signal is received, Rx tuning can be used to clean-up the signal quality. When there is a time limit to perform Rx tuning, a signal is to be passed to a PCS layer within the time limit and the link comes-up if the link is acceptable. If the link does not pass, training can be restarted. In some examples, Tx 208-Rx 212 and/or Tx 210-Rx 206 can utilize independent Rx tuning. In some embodiments, an amount of time to perform equalizer tuning is the same for Tx 208-Rx 212 and Tx 210-Rx 206.

When auto-negotiation is used to establish link between two ethernet ports an IEEE defined procedure is followed. First, a "base page" exchange can be performed to determine common capabilities and select an operating mode (e.g., link speed (e.g., 1000BASE-KX, 10GBASE-KX4 . . . 100GBASE-CR4 and so forth), FEC mode, pause capability, and so forth). Next, an arbitrary length next page exchange phase can occur. Next page exchange can be used, for example, to advertise IEEE capabilities as well as non-IEEE capabilities such as the Ethernet Consortium modes. At the end of next page exchange, the selected operating mode can be configured and a link-training phase can begin. During this link training phase, changing the peer transmit (e.g., Tx 208 or Tx 210) equalization settings and monitoring the effect on link quality at the receiver (e.g., Rx 206 or Rx 212) and adjusting equalization settings to optimize the link can occur.

In some examples, a link training time can be extended by specification of an earlier starting time and use of a default link training time. For example, devices can negotiate (e.g., using AN, Next Page Exchange, or proprietary exchange scheme) a starting time for link training by negotiating an offset from a default start of link training time where the offset indicates an amount of time before the default start of link training time at which to start link training. Devices can indicate a capability to start link training before a default start of link training time, indicate a greatest amount of time before a default start of link training time at which to start link training, and select a lesser of the amounts of time before a default start of link training time at which to start link training.

Communications between devices can occur using any protocol. For example, Ethernet frames can be sent by NIC 100 to device 120. For example, Ethernet frames can be sent by device 120 to NIC 100. An Ethernet frame can include one or more of: a preamble, start of frame delimiter (SFD), destination MAC address, source MAC address, EtherType field, length field, frame check sequence (e.g., cyclic redundancy check (CRC)), and payload.

From the perspective of either port there are four approaches to link-training, although more or fewer approached can be used.

(1) The local port neither sends the proprietary next page nor receives one. This results in no extension of the link-training phase.

(2) The local port sends the proprietary next page but does not receive one from the link partner (it will receive a NULL page in response). This indicates the link-partner either is unable or unwilling to extend the link-training time. This results in no extension of the link-training phase.

(3) The local port is unable or unwilling to extend the link-training time so does not send the proprietary next page but receives one from the link partner (it will respond with a NULL page). This results in no extension of the link-training phase.

(4) The local port both sends and receives the proprietary next page, indicating both ports are able and willing to extend the link training time. The amount of time to extend the link-training phase is defined to be the minimum of the times advertised by the two ports. In case (4), the subsequent link-training phase will be allowed to last longer (if necessary) than the IEEE defined maximum time. If the time is still exceeded then auto-negotiation will be restarted.

According to various embodiments, a link training controller advertises extended link training ability during the Next Page Exchange phase of Auto-Negotiation. There are two Next Pages required to advertise this ability. First, an Organizationally Unique Identifier (OUI) tagged formatted first Next Page is sent with the Vendor OUI of <tbd> using message code #1. Next, an OUI tagged unformatted second Next Page is sent with the requested extension of time in milliseconds. An example format for a first next page is shown in FIG. 3A.

In the FIG. 3A, the following are example contents of fields of a next page.

D0_3: 0001b (indicating "Organizationally Unique Identifier Tagged Message")
D4_10: 0000000b
D11: T
D12: 0b
D13: 1b
D14:ACK
D15: 1b (NP)
D16_26: Vendor OUI <tbd> bits [23:13]
D27_31: 00000b
D32_42: Vendor OUI <tbd> bits [12:2]
D43_47: 00000b FIG. 3B shows an example second next page format can be as follows. Example content of fields can be as follows.
D0_3: 0001b (indicating "Extended Link Training Time" value follows).
D4_8: 00000b
D9_10: Vendor OUI <tbd> bits [1:0]
D11: T
D12_13: 00b
D14: ACK
D15: NP
D16_47: time, in milliseconds, to extend for link training (unsigned 32-bit value). In
some examples, this value is the absolute time for link training, which can be less than,
equal to, or more than the IEEE 802.3 default link training time.

In some examples, if one side of the link does not support "Vendor Link Training Extension Ability", then it will respond to the OUI tagged formatted Next Page with a NULL page. This can have the effect of advertising a value of "0" for the "Time_in_ms" field.

In some examples, if one side of the link does not support option "Extended Link Training Time," then it will respond to the OUI tagged unformatted Next Page with a NULL page. This can have the effect of advertising a value of "0" for the "Time_in_ms" field.

The time allowed for link-training is resolved to be the highest common denominator of the values advertised by the two sides of the link. If the resolved time is less than the IEEE (or Ethernet Consortium) defined link-training time, then the IEEE (or Ethernet Consortium) defined link-training time is used instead.

The link-training time specified in the next page can either be: (1) a value to be added to the default IEEE link training time (e.g., a relative value) or (2) an absolute link training time to use. In (1) there is no possibility the negotiated link training time could be less than the default IEEE link training time, in (2) link training could be less than default IEEE link training time.

In some examples, the default link training time can be set to a higher or lower value to extend or decrease link training time. For example, AN, Next Page Exchange, or proprietary exchange scheme can be used to set or change the default link training time. In some examples, where a default link training time is set or changed, linking training time extension or decrease may or may not be used.

Figure 2B:
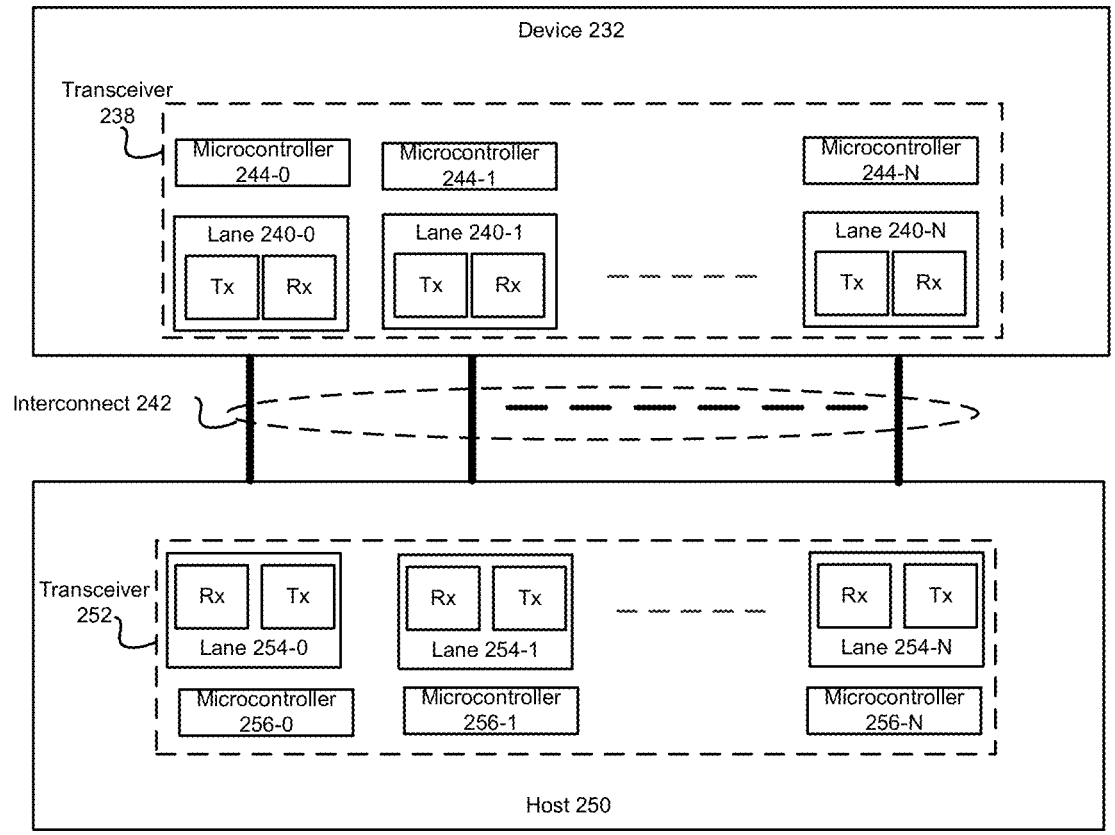

Referring next to FIG. 2B, in some embodiments, after link training is complete, a microcontroller 244 (e.g., any of 244-0 to 244-N) associated with any lane can initiate re-training. For example, a device driver, platform device or software can trigger negotiation and implementation of link re-training. Link re-training can be executed independently per SerDes lane. Various embodiments provide a protocol to setup re-training, provide requests in connection with re-training, or receive responses in connection with re-training. A protocol stack (e.g., layer 3) can recognize a message as indicating setup, request or response.

In some examples, various messages can be used to initiate (setup) link training to indicate supported taps, request application of particular equalizer tap parameters (e.g., hold, increment or decrement Tx Tap #x)). In some examples, one or more increases or one or more decreases can be applied instead of an increment or decrement. Various embodiments provide a response that indicates when particular equalizer tap parameters are being used (e.g., Tx Tap #x updated). The Tx Taps can be defined using signed integer values (−3 . . . 0 . . . +3). Pre-emphasis Taps can be identified by negative values whereas Post-emphasis Taps can be identified by positive values. A main tap can be identified by the value zero (0).

In some cases, not all taps may be re-trainable by a given SerDes or its controller. In some examples, a transmitter can advertise any tap capable of adjustment by link re-training. The supported taps can be communicated to the link partner in an initial set-up message. The set-up message can identify the local Port_id that will be the subject of Tap change Requests by the link-partner. A Port_id can be provided in any response. In some examples, a Port_id value can be any 8 bit unsigned value (or any other value (e.g., 32 bits)) that the local device can use to map to a local port. Since the link came up prior to this protocol being used it is assumed both sides agree on the number and mapping of SerDes lanes used by the port.

Supported taps can be identified by an 8-bit unsigned value containing a map of supported Tx Taps. For example, a mapping from bit to Tap # is as follows:

| Tap # | Bit |
| --- | --- |
| −3 | 0 |
| −2 | 1 |
| −1 | 2 |
| 0 | 3 |
| 1 | 4 |
| 2 | 5 |
| 3 | 6 |

For PAM4 encoded signals, Tx taps can be identified as follows:
Pre2=−2
Pre1=−1
Main=0
Post1=1
Post2=2.

However, other types of formatting can be used. Requests to change unsupported taps can be considered a protocol error and can be be ignored.

If the link came up prior to this protocol being used it is assumed both sides agree on the number and mapping of SerDes lanes used by the port.

In some examples, a message format for SETUP can include: {SETUP, Port_id, <supported_Taps>}.

To identify a tap that is the subject of a Request or Response the following identifying data can be included in the full Request or Response message:
{Port_id, Logical_lane_id, Tap_id, REQ/RSP}, where:
  Port_id is the local Port_id received in the set-up message
  Logical_lane_id is a value from 0 to 15 indicating the logical lane on the port
  Tap_id is the subject Tap # (e.g., −3 to +3)
  SETUP/REQ/RSP/TRAINED (0-3) identifies this message as either a Set-up (0), Request (1), Response (2), or Trained (3) message. Trained messages indicate completion of the protocol.

In some examples, Requests can be one of: HOLD, INC, DEC. In some examples, a message format for REQUESTS can be: {REQ, Port_id, Logical_lane_id, Tap_id, <INC/DEC/HOLD>}. In some examples, Responses can include one of: NOT_UPDATED, UPDATED, MIN, MAX. In some examples, a message format for Requests can include: {RSP, Port_id, Logical_lane_id, Tap_id, <NOT_UPDATED/UP-DATED/MIN/MAX>}. Accordingly, a full message can contain the following information:

ing tap settings applied during the re-training that is successful, and before the time expiration, are used and a training protocol may not be restarted. However, after the amount of time has passed, protocol training restart occurs to determine Tx tap settings and/or default Tx tap settings can be used.

Operation in "destructive mode" is communicated in the set-up message by three parameters:
  DESTRUCTIVE_MODE_ABILITY
  DESTRUCTIVE_MODE_REQ
  <max-link-loss-time>
  DESTRUCTIVE_MODE_ABILITY indicates this node supports destructive mode operation as an option.
  DESTRUCTIVE_MODE_REQ indicates this node requires (not just "requests") destructive mode operation.
  <max-link-loss-time> is a 32-bit unsigned value representing the maximum time, in milliseconds, that the link may be down and not cause a protocol restart. This time may be different in each direction and should be set to the maximum amount of time the local receiver adaptation should be allowed to take.

A protocol error can occur by setting DESTRUCTIVE_MODE_REQ=1 but DESTRUCTIVE_MODE_ABILITY=0.

If one side requires destructive mode (DESTRUCTIVE_MODE_REQ=1) but the other side does not support destructive mode (DESTRUCTIVE_MODE_ABILITY=0), the protocol can terminate.

If one or both sides requires destructive mode operation, then an extra message exchange is used to determine which side goes first.
  {INITIATOR_BID, <local-bid>, <remote-bid>}
  <local-bid> is a non-zero 32-bit unsigned value that determines which side starts first. It can be generated by some random process to guarantee convergence. The

```
{SETUP, Port_id, <supported_Taps>, DESTRUCTIVE_MODE_ABILITY,
DESTRUCTIVE_MODE_REQ, <random-initiator-bit> }
{ REQ, Port_id, Logical_lane_id, Tap_id, <INC/DEC/HOLD> }
{ RSP, Port_id, Logical_lane_id, Tap_id, <NOT_UPDATED/UPDATED/MIN/MAX> }
```

It may take time for the transmitter to accomplish the setting change (Request) and the receiver to know the configuration change has been applied or not applied (Response). Because messages may be lost or corrupted, the exchange protocol can recover from errors.

Some SerDes may not be able to fully optimize incrementally and may use a re-adaptation mode that causes the link to go down, in one or both directions, when a tap change is being evaluated (Rx Equalization). Support of this mode of operation can involve use of the protocol operating in one direction at a time. For example, one side can make Tap Requests and adjust its receiver equalization and, next, the other end of the link can start the process to adjust receiver equalization. This is necessary to distinguish the cause of link loss, which could be due to the receiver adaptation (caused by the remote side) or to a requested tap change (caused by the local side).

A "destructive mode" (or "restart inhibit mode") may cause a link to fail (to go "down") during the training but requests the receiver to not allow the link to go down until after an amount of time has passed so that default Tx tap settings are not reverted-to until after the amount of time has passed (max-link-loss-time) to avoid protocol restart. Train-side with the largest "bid" goes first. In the event of a tie, each side submits a new random "bid".
  <remote-bid> is the 32-bit value last received from the other side as its "bid". The initial value of this field is "0", before any bid has been received from the other side. The INITIATOR_BID message could be transmitted periodically to recover form lost messages.

Bidding continues until a bid from the other side is received with a <remote-bid> field matching the value current <local-bid>, and with different values for the local and remote bids. At that point, both sides determine which should go first and the "winning" side can initiate Tap Requests.

In some examples, LLDP protocol data units (PDUs) are used for capability advertisement, request and response. In some examples, there are 3 types of TLVs:
  StartUpTlv can include a local port identifier that will be returned by the link partner in any subsequent TLV to identify a specific port. StartUpTlv can also include indications of which taps are supported on the local device. Supported taps can be pre2, pre1, main, post1, post2, or fewer, more or other taps. In some examples, InfiniBand link settings can be adjusted.

RequestTlv can include the localPortId received in the StartUpTlv for this port. RequestTlv can also include a logical laneID (0-7) within the localPortid, a tapId indicating which Tx tap is the subject of the request, and the request itself, HOLD=0 or UPDATE=+/−1.

StatusTlv can include the localPortId received in the StartUpTlv for this port. StatusTlv can also include a logical laneID (0-7) within the localPortid, a tapId indicating which Tx tap is the subject of this status report, and the status itself, NOT_UPDATED=0, UPDATED=1, MIN=2, MAX=3. MIN or MAX can be returned to indicate no further changes in the same direction are possible and should be treated the same as UPDATED.

In some examples, LLDP PDUs can have up to two link training TLVs per logical lane: one requestTlv and one statusTlv (responseTlv). A requestTlv can initiate a change in a Tx tap setting on the link partner. PDUs may be generated in response to receipt of a PDU from the link partner or after a timeout period. If any tap is in the process of being changed and no statusTlv has been received for it in the last some amount of time, a PDU can be generated to duplicate the requested change to handle lost or corrupted PDUs.

In some examples, changes to tap settings can be made in the smallest possible increments/decrements to minimize the potential for causing a loss of link as a result of a tap change.

FIG. 2B depicts an example system for communicatively coupling a network device to another network device. For example, host 250 and device 232 can include a network device such as one or more of: a network interface, switch, router, server, host computing platform, interconnect, fabric, rack, or any computing or communications device. For example, device 232 can be connected to an interface with multiple electrical links (e.g., backplane or copper cable). The system provides for multiple lanes of transmit-receive pairs that can be used to transmit or receive electrical signals between host 250 and device 232. A lane can transmit and/or receive a signal. A transmitter of a lane can use an equalizer implemented in an analog circuit to generate an electrical signal for transmission. The equalizer can have one or more current sources that are used to create a signal whereby weights of current sources can be adjusted to change signal characteristics. Equalizer settings can be modified to change weights of current sources. For example, a digital-to-analog converter (DAC) can be used to create signal in the digital domain and output the result in an analog format.

Various embodiments use any microcontrollers 244 to negotiate time to complete link training and whether to extend training time. In addition, microcontrollers 244 can initiate and manage re-training of transmitter and/or receiver equalizer settings.

Transceiver 238 can be used for electrical signal transmission and receipt between device 232 and host network interface device 250. Transceiver 238 can provide multiple transmit and receive lanes for electrical signal communication between device 232 and host device 250. For example, lanes 240-0 to 240-N can provide transmit and receive circuitry for coupling with receive and transmit circuitry of lanes 254-0 to 254-N of host device 250. Lanes 240-0 to 240-N can provide serializer/deserializer (SerDes) formatting of signals. In some examples, transceiver 238 can be part of a PMD or PHY.

Device 232 can be communicatively coupled to host device 250 by an interconnect 242. Interconnect 242 can be electrical signal conductors that couple pins or holes of lanes 240-0 to 240-N of a pluggable device 232 to holes or pins of lanes 254-0 to 254-N of host 250. Host network interface device 250 can transmit or receive signals in electrical format to or from device 232.

Host device 250 can include transceiver 252 for communication with device 232. Transceiver 252 can include lanes 254-0 to 254-N where any of lanes 254-0 to 254-N includes receive and transmit circuitry. In some examples, transceiver 252 can be part of a PMD or PHY. Any microcontroller 256-0 to 256-N can be used to manage operation of its lane in accordance with embodiments described herein.

In some embodiments, a single microcontroller can manage equalizer settings of one or multiple lanes. The one or more parameters can cause a receiver or transmitter device in any of lanes 254-0 to 254-N to adjust its equalizer setting for a specific tap, whether to increase or decrease the coefficient value of an equalizer tap. In some embodiments, the settings of a tap can be adjusted independent of adjustment of settings of another tap.

In some examples, host 250 can request to change an equalizer setting of any tap of a transmitter equalizer circuit of device 232. Likewise, device 232 can request to change an equalizer setting of any tap of a transmitter equalizer circuit of host 250. Accordingly, device 232 and host 250 can adjust transmitter equalizer settings used by a partner device. Moreover, any of device 232 and host 250 can adjust receiver equalizer settings to compensate for channel distortions.

For example, to initiate an equalizer setting change, any microcontroller 244-0 to 244-N can determine a signal quality of a received signal and determine what transmitter side tap of host device 250 to change and whether to increment or decrement the setting of the tap. For example, an eye opening of a received signal can be measured. An eye can represent 1-to-0 and 0-to-1 transitions of a signal and indicate whether the transitions occur within isolated time regions. A microcontroller can estimate inter-symbol interference (ISI) and select settings based on an ISI reaching a minimum value. A microcontroller can search through available transmitter tap settings and select settings that lead to a most open eye. Transmitter equalizer settings can be changed periodically starting at or after link startup and can run periodically. Similar operations can occur for microcontroller 256-0 to 256-N to adjust transmit equalizer settings of device 232.

Any of device 232 or host 250 can perform packet processing such as one or more of: media access control, any protocol layer processing, security, routing, destination lookup, and so forth.

Figure 4A:
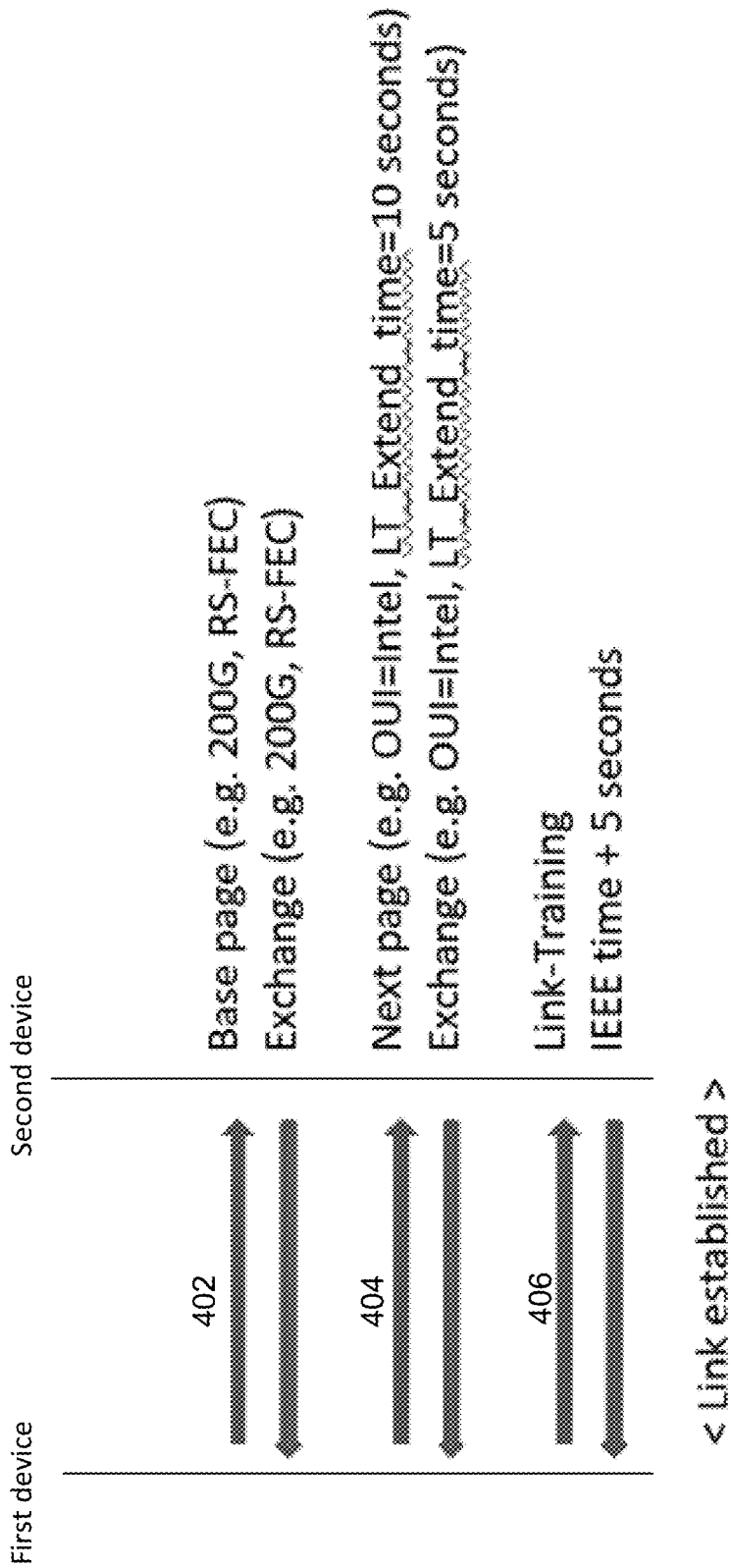
FIG. 4A depicts a process sequence of a link training.

FIG. 4A depicts a process sequence of a link training. At 402, an IEEE 802.3 Clause 73 AN base page exchange can commence. In this example, 200 Gbps link speed and RS-FEC capabilities are advertised. At 404, Next page exchange can occur. In some examples, both link partners advertise vendor OUI is identified as Intel whereas one link advertises training extension time of (up to) 5 seconds and the opposite link advertises training extension time of (up to) 10 seconds. However, a vendor OUI of the device can be advertised. In some examples, the highest common denominator of the extension times is selected, namely 5 seconds. At 406, the link training scheme uses a default link training time+5 seconds. An example link training format is in clause 72 of IEEE 802.3-2018.

Figure 4B:
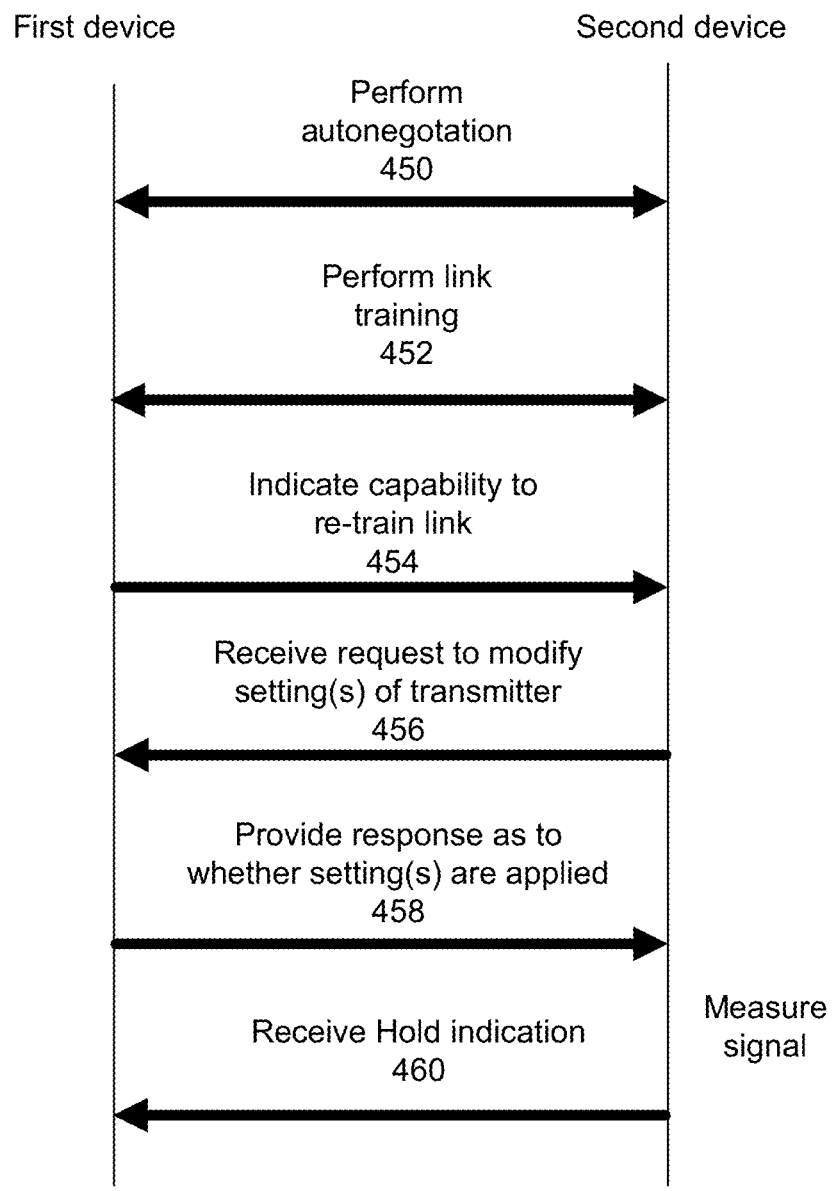
FIG. 4B depicts an example sequence that can be used for a link re-training operation.

FIG. 4B depicts an example sequence that can be used for a link re-training operation. At 450, auto-negotiation can be applied to set one or more parameters of operation between partner devices. For example, IEEE 802.3, Clause 73 AN can be used to set at least link speed, FEC mode, pause capability and/or other parameters. At 452, link training can be performed to set transmit and receive SerDes equalizer parameters. For example, IEEE 802.3 Clause 72 link training can be performed to set transmit and/or receiver equalizer settings. In some cases, link training duration can be extended in accordance with examples described herein. Thereafter, data or other content can be transmitted across one or more lanes or a link.

At 454, capability to re-train a link can be negotiated. For example, a transmitter can advertise any tap capable of adjustment by link re-training to the link partner in an initial set-up message. The set-up message identifies the local Port_id that will be the subject of tap change requests by the link-partner. At 456, a request to modify transmitter component settings can be received at the first device. The request can include a port identifier that will be the subject of tap change requests by the link partner, lane identifier, subject tap(s), or increment/decrement/hold tap setting. At 458, a response is provided to the second device to indicate that that specified tap settings have been applied. The second device can measure signal characteristics such as BER, eye size, and other errors. In this example, the second device determines that the settings are acceptable. At 460, the second device indicates that the settings are to be held. The tap settings can be applied and stored for current and future use.

Note that both first and second device can do independent transmitter adjustments. In some examples, receiver equalizer settings can be set by a link partner in a similar manner as that used to specify transmitter tap settings.

Figure 5A:
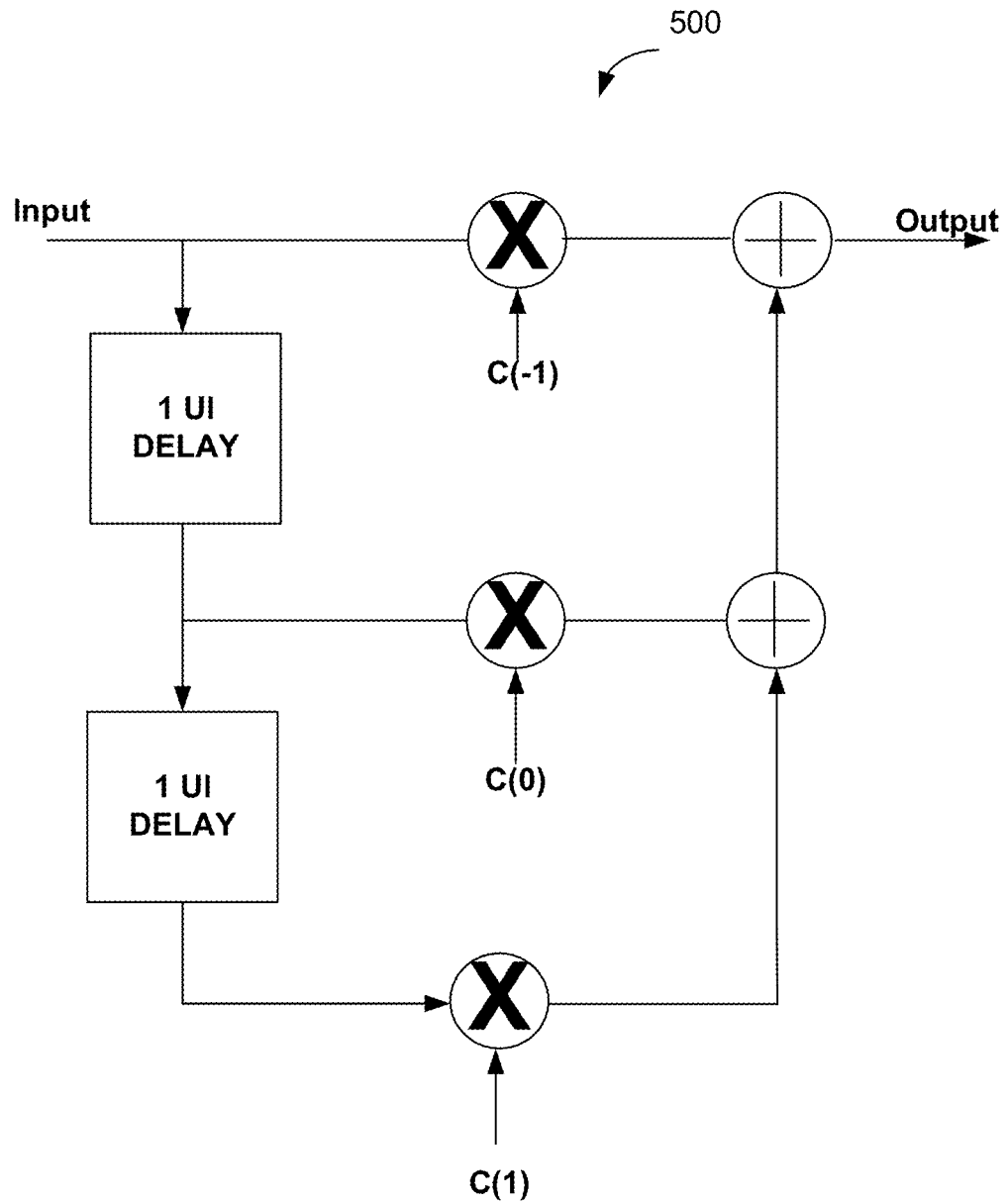
FIG. 5A depicts an example of equalizer.

FIG. 5A depicts an example of equalizer. The transmitter equalizer 500 includes a pre-cursor tap c(−1), a cursor tap c(0), and a post-cursor tap c(1). In an illustrative embodiment, filter tap settings identifies one of four possible tap values for the pre-cursor tap c(−1) using two bits and one of six possible tap values for the post-cursor tap c(1). The cursor tap c(0) coefficient may be calculated based on the values of the other two tap coefficients, c(−1) and c(1), such that the equation: $c(0)-c(1)-c(-1)=1$, is satisfied. The filter tap settings may be modified by incrementing or decrementing the filter tap settings.

Figure 5B:
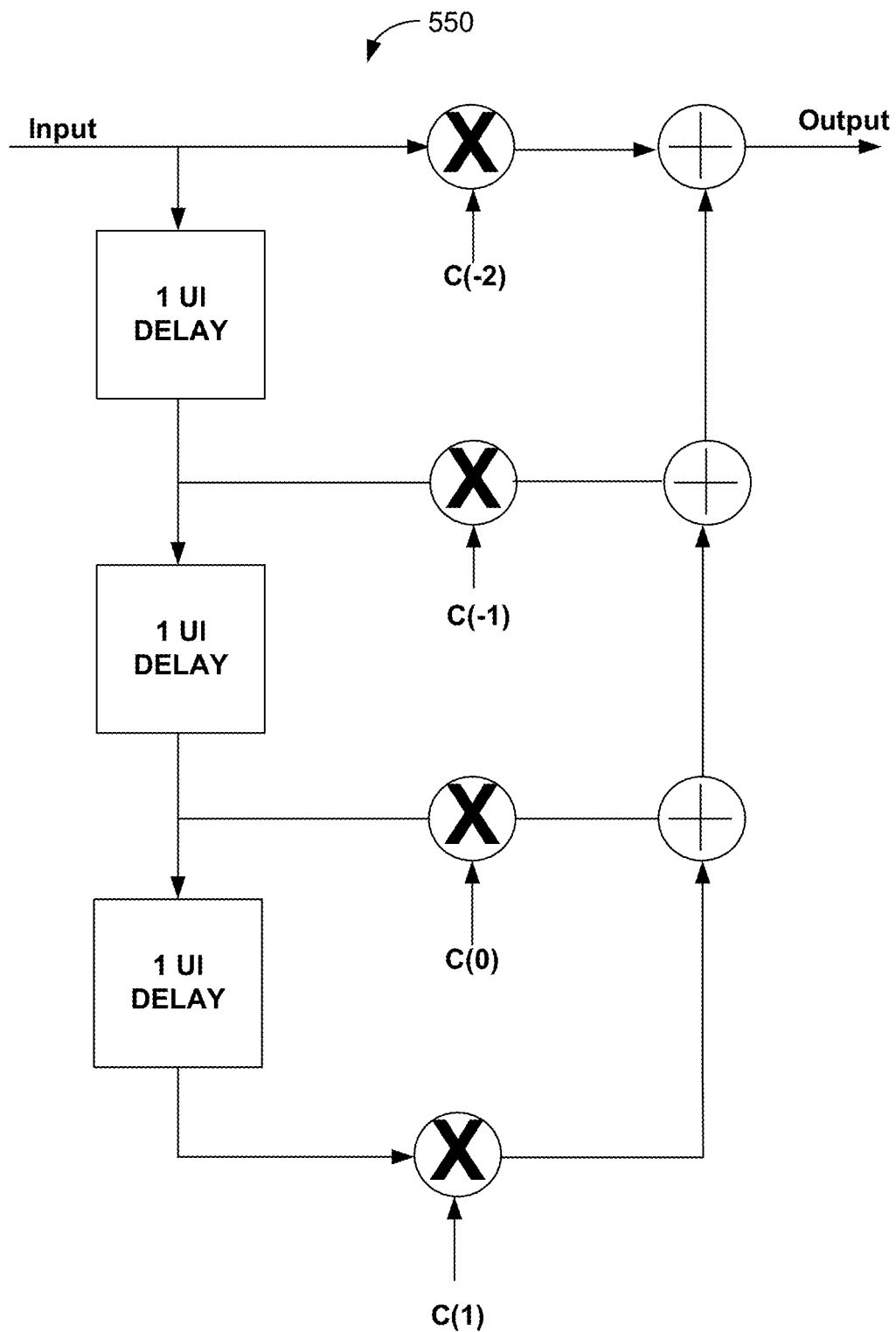
FIG. 5B depicts a functional model of a structure of a four-tap feed-forward equalizer (FFE).

FIG. 5B depicts a functional model of a structure of a four-tap feed-forward equalizer (FFE) 550 in a transmitter. An FFE 550 is implemented in each communication lane interface of a chip-to-chip or chip-to-module interface. The FFE 550 includes a pre-cursor tap c(−2), a pre-cursor tap c(−1), a cursor tap c(0), and a post-curser tap c(1). The filter tap settings may be modified by incrementing or decrementing the filter tap settings. A coefficient of any tap may be modified independent of coefficient of another tap or taps.

Figure 6A:
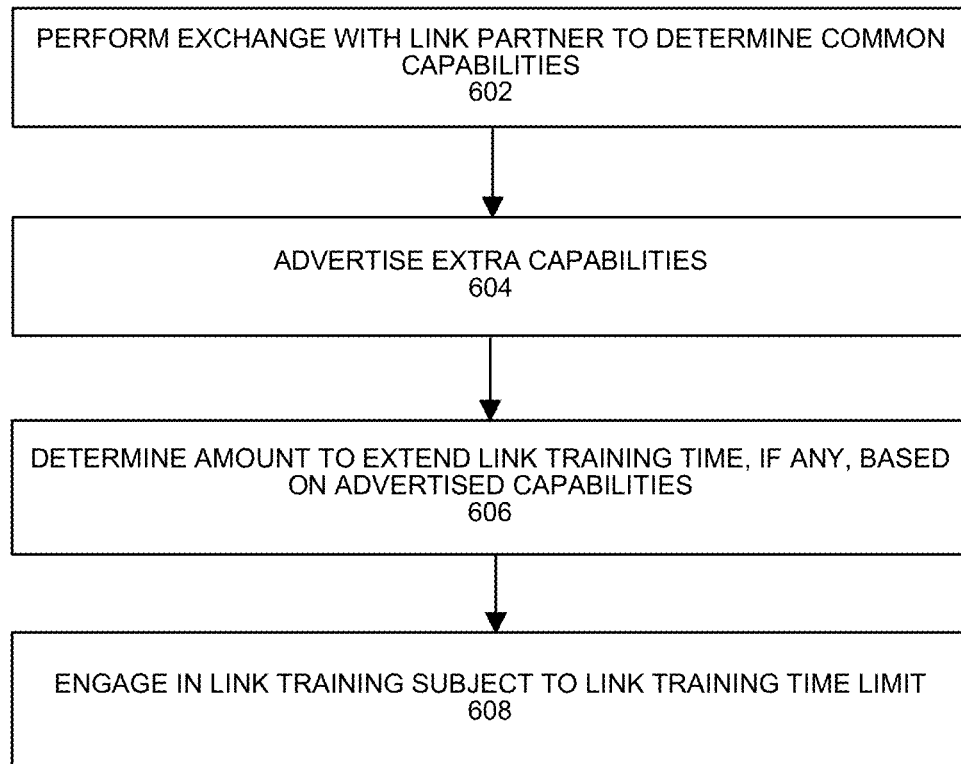
FIGS. 6A and 6B depict example processes.

FIG. 6A depicts an example process to potentially extend a time allocated for link training. The process can be performed by a transceiver in a first device with a wired or wireless connection to a transceiver in a second device. For example, the first device can be a network interface, host device, electrical or optical module, or any device. For example, the second device can be a network interface, host device, electrical or optical module, or any device. The connection can be a copper cable, optical cable, backplane, any type of Ethernet cable, or any wired or wireless signal propagation media. A transceiver can include a transmitter and a receiver. Signals propagated through the connection can be use compatible with Ethernet, FibreChannel, InfiniBand, or Serial Attached Small Computer System Interface (SAS).

At 602, an exchange occurs between the transceiver of the first device and the transceiver of the second device to determine common capabilities with a link partner. For example, IEEE 802.3 AN can be performed to determine at least link speed, FEC capabilities, and other capabilities. At 602, an operating mode for the connection can be selected. The operating mode can be determined as the least capabilities advertised by both transceivers. The operating mode comprises one or more of speed, forward error correction (FEC), pause capability, and/or other capabilities.

At 604, the transceivers can engage in an exchange phase to advertise other capabilities. For example, capabilities can be advertised using Next Page Exchange phase of Auto-Negotiation. Other capabilities can include an amount to extend link training time that is supported, not supported, amount of extension, and so forth.

At 606, both transceivers can determine an amount to extend link training time based on capability of transceiver and advertised capability of link partner transceiver to extend link training time, if any. For example, if one transceiver supports extending link training but the other does not, then the default link training time is used. If one transceiver supports a higher extended link training time than another, the highest common denominator extended link training time is used by both transceivers.

At 608, the transceivers engage in a link-training phase for the link training time plus the amount to extend link training time. The link-training phase can include requesting changes in the peer transmit equalization settings, monitor the effect on link quality at the receiver, and adjust equalizer settings to optimize one or more of errors, eye size, and so forth.

Figure 6B:
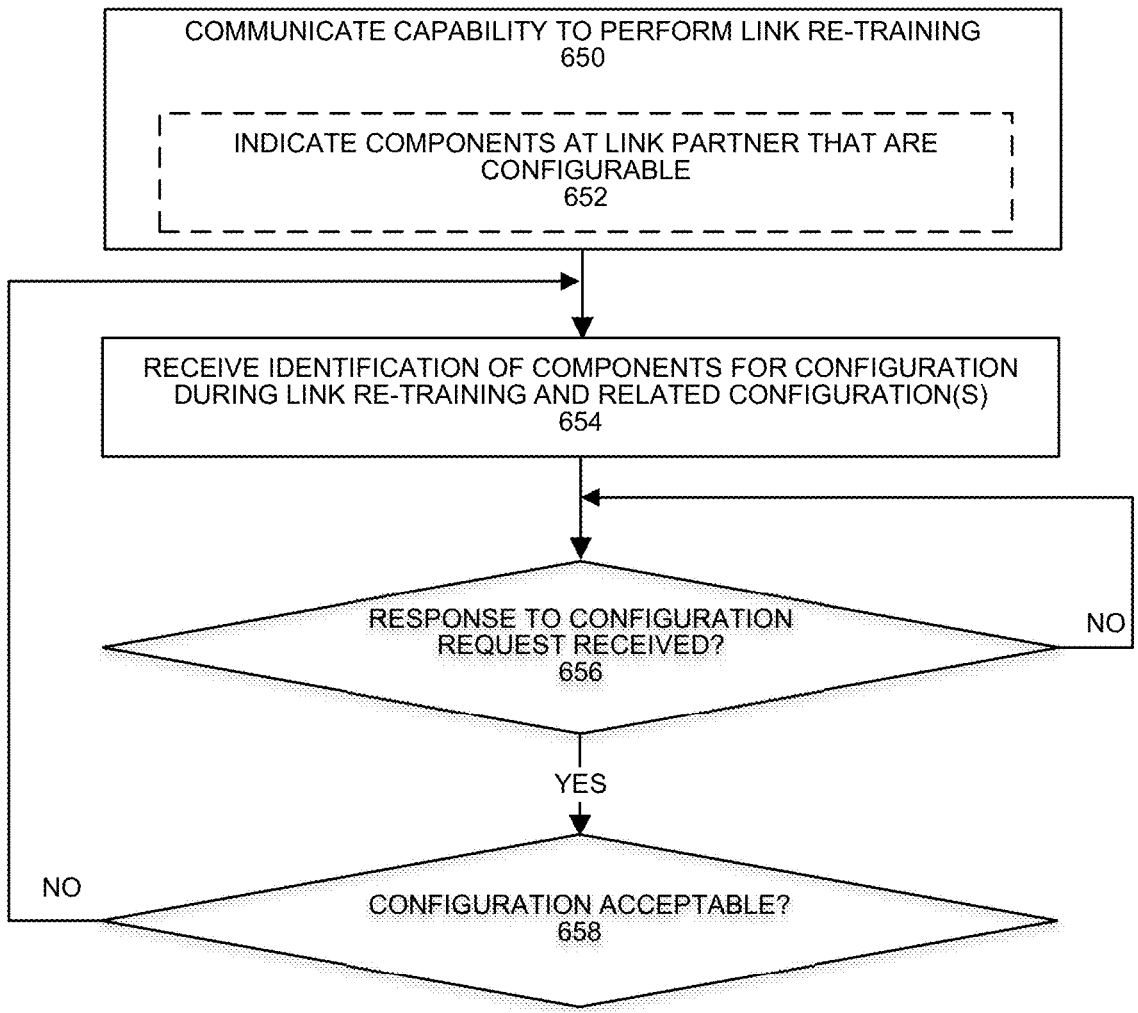

FIG. 6B depicts an example process to perform link re-training. At 650, a capability to perform link re-training is communicated to a link partner. For example, a capability to perform link re-training can be in the format of a setup message described herein. For example, 650 can include 652, where a capability to perform link re-training can include an indication to setup a re-training, a port identifier, and identification of taps that can be configured during link re-training.

At 654, a request to reconfigure components that are available for configuration during link re-training can be received. For example, a request can include a port identifier that will be the subject of tap change requests by the link partner, lane identifier, subject tap(s), or increment/decrement/hold tap setting.

At 656, a determination can be made whether a response to a configuration request was received. For example, a response can include an indication of whether the re-configuration was performed or not. Other examples of response messages are provided herein. For example, the response can include one or more of: identifier of a port identifier, lane identifier, subject of tap, and updated/not-updated/min reached/max reached. If the response was received, the process continues to 658. If the response was not received, then 656 can repeat.

At 658, a determination can be made as to whether the configuration is acceptable. For example, if a bit error rate (BER), eye size, signal-to-noise ratio (SNR), or any other desired characteristics are achieved, the configuration can be determined to be acceptable. After a configuration is determined to be acceptable, data transmission can proceed or resume. Otherwise, the receiver can indicate other configurations at 654 and the process continues.

Figure 7A:
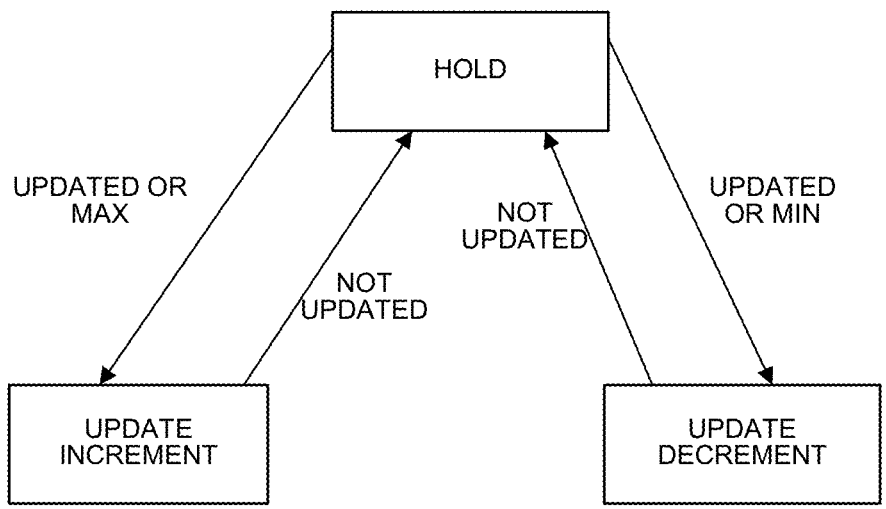
FIGS. 7A and 7B depict example processes.

FIG. 7A depicts an example of states that can be used by a state machine that can be used for modifying a tap value to attempt to achieve both ends of the link agreeing on the state of an update. For example, a SerDes driver or microcontroller associated with a SerDes can implement a state machine. A Logical_lane_id can support independent state-machines for updates to each supported Tap. A request for a tap setting change can be tracked by a state-machine. In some examples, status values in the response message(s) can update the state. The state-machine can include three states, in some examples:

ST_IDLE, a state from which a change can be initiated. Entered at start-up or after exiting the ST_UPDATED state upon completion of a tap change.

ST_UPDATE, entered upon issuing a requestTlv for the tap. In this state the requestTlv is changed to indicate UPDATE (+/−1). Exited upon receiving a statusTlv indicating UPDATED (or LIMIT).

ST_UPDATED, entered upon receiving a statusTlv with the status UPDATED (or LIMIT). In this state the requestTlv is changed to indicate HOLD. Exited upon receiving a statusTlv indicating NOT_UPDATED.

A Request message may be issued periodically to handle the case where a message is lost.

The initial state can be HOLD where there is "no request to change." If a request is made to change a Tx Tap setting and the status of the previous Request is NOT UPDATED, then the request can be issued and the state of the Tap Request changed to Update INCREMENT/DECREMENT, depending on the Request. This state can be maintained until the status of the Tap (from a Response message) becomes one of UPDATED, MIN, or MAX. UPDATED can indicate the Tap change request was effected or performed. MIN can indicate a decrement request was made and the Tap is now at its minimum value, or the Tap was already at its minimum value. Likewise, MAX can indicate an increment request was made and the Tap is now at its maximum value, or the Tap was already at its maximum value.

Figure 7B:
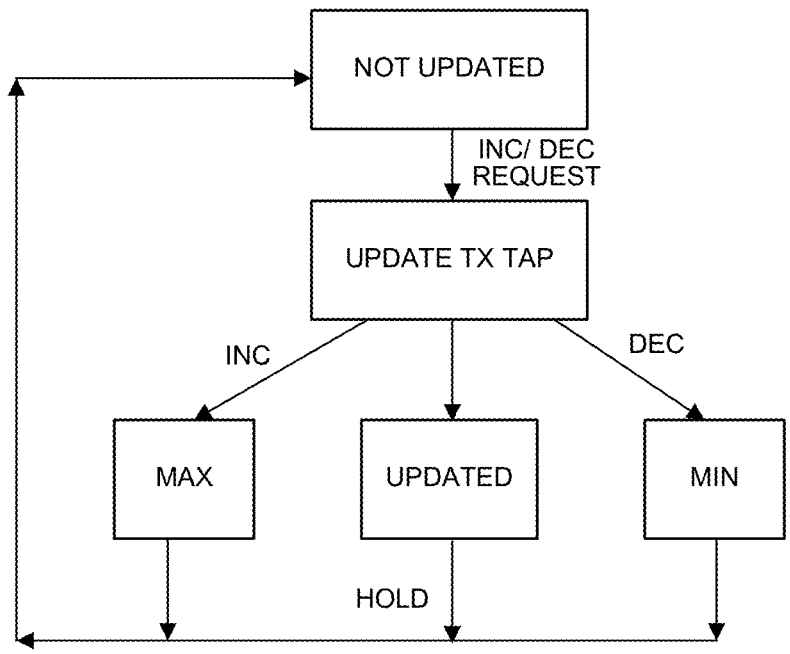

FIG. 7B depicts an example state machine that can be used to track states of update requests. For example, a SerDes driver or microcontroller associated with a SerDes can enact a state machine. In some examples, each Logical_lane_id can support independent state-machines for updates to each supported Tap. An initial state of a Tap can be NOT UPDATED, whereby no change is in-progress. When a Request (INCREMENT (INC)/DECREMENT (DEC)) is received, the state can move to UPDATE TX TAP while the change is being effected in hardware. After the change is complete, the state can change to one of three states depending on the result of the change. If the Tap was successfully changed, the state changes to UPDATED. If the Tap was incremented and the Tap is now at its maximum value then the state can change to MAX. Likewise, if the Tap was decremented and the Tap is now at its minimum value the state changes to MIN. This state can be maintained until a HOLD Request is received and after the HOLD Request is received, the state can revert to NOT UPDATED.

Since it is possible changes requested using this protocol could cause the link itself to go down, each side of a link can revert its Tx Taps to their original settings in the event the link goes down. Changing transmitter side parameters can cause a link to drop and in such case, initial settings can be used before adjustment.

Figure 8:
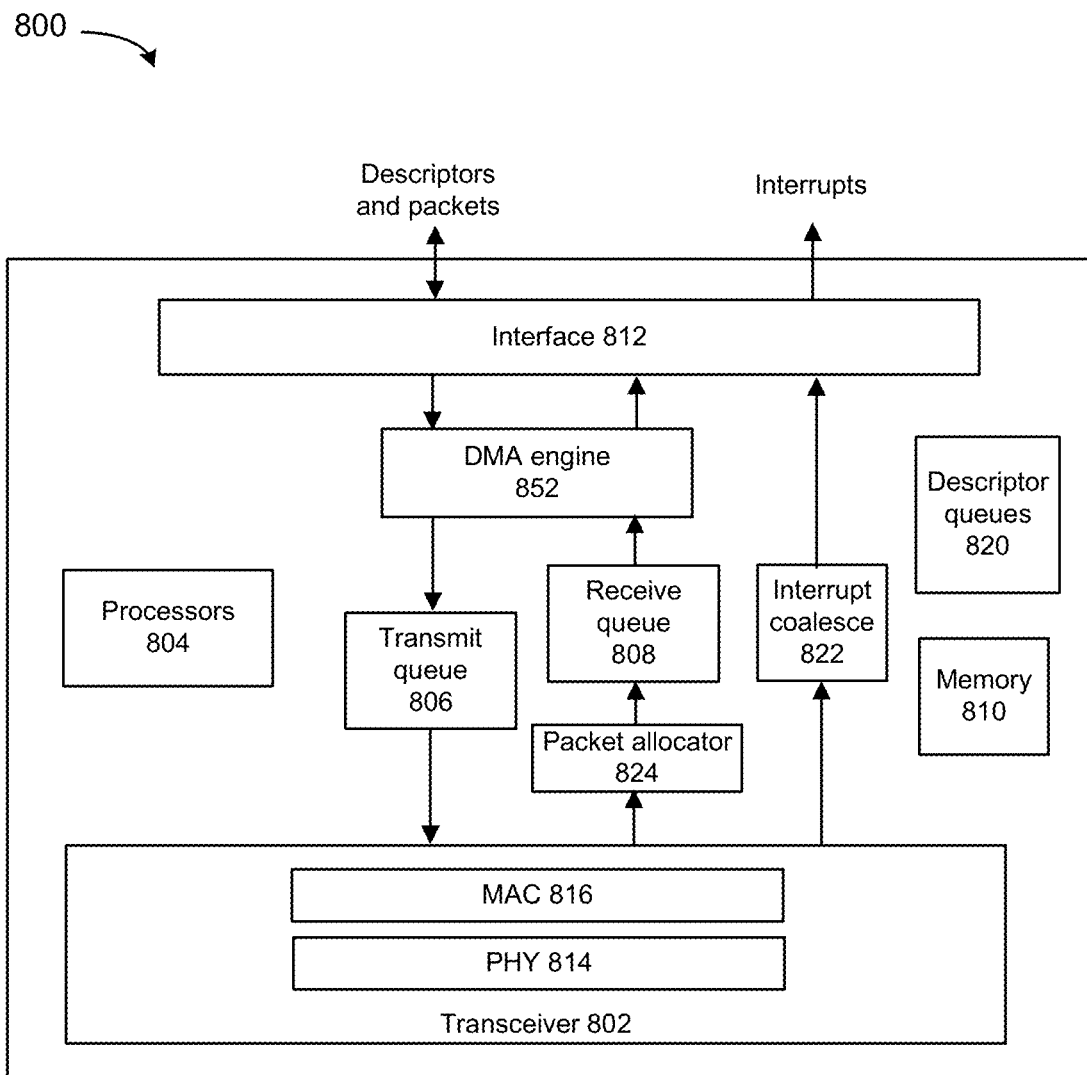
FIG. 8 depicts a network interface.

FIG. 8 depicts a network interface that can use embodiments or be used by embodiments. Various resources in the network interface can perform link establishment, link training or link re-training in accordance with embodiments described herein. In some examples, Network interface 800 includes a network interface, network interface controller or a network interface card. In some examples, network interface 800 can be part of a switch or a system-on-chip (SoC) with devices such as a processor or memory. Network interface 800 can include transceiver 802, processors 804, transmit queue 806, receive queue 808, memory 810, and bus interface 812, and DMA engine 852. Transceiver 802 can be capable of receiving and transmitting packets in conformance with the applicable protocols such as Ethernet as described in IEEE 802.3, although other protocols may be used. Transceiver 802 can receive and transmit packets from and to a network via a network medium (not depicted). Transceiver 802 can include PHY circuitry 814 and media access control (MAC) circuitry 816. PHY circuitry 814 can include encoding and decoding circuitry (not shown) to encode and decode data packets according to applicable physical layer specifications or standards. MAC circuitry 816 can be configured to perform MAC address filtering on received packets, process MAC headers of received packets by verifying data integrity, remove preambles and padding, and provide packet content for processing by higher layers. MAC circuitry 816 can be configured to assemble data to be transmitted into packets, that include destination and source addresses along with network control information and error detection hash values.

Processors 804 can be any a combination of a: processor, core, graphics processing unit (GPU), field programmable gate array (FPGA), application specific integrated circuit (ASIC), or other programmable hardware device that allow programming of network interface 800. For example, processors 804 can provide for identification of a resource to use to perform a workload and generation of a bitstream for execution on the selected resource. For example, a "smart network interface" can provide packet processing capabilities in the network interface using processors 804.

Packet allocator 824 can provide distribution of received packets for processing by multiple CPUs or cores using timeslot allocation described herein or RSS. When packet allocator 824 uses RSS, packet allocator 824 can calculate a hash or make another determination based on contents of a received packet to determine which CPU or core is to process a packet.

Interrupt coalesce 822 can perform interrupt moderation whereby network interface interrupt coalesce 822 waits for multiple packets to arrive, or for a time-out to expire, before generating an interrupt to host system to process received packet(s). Receive Segment Coalescing (RSC) can be performed by network interface 800 whereby portions of incoming packets are combined into segments of a packet. Network interface 800 provides this coalesced packet to an application.

Direct memory access (DMA) engine 852 can copy a packet header, packet payload, and/or descriptor directly from host memory to the network interface or vice versa, instead of copying the packet to an intermediate buffer at the host and then using another copy operation from the intermediate buffer to the destination buffer.

Memory 810 can be any type of volatile or non-volatile memory device and can store any queue or instructions used to program network interface 800. Transmit queue 806 can include data or references to data for transmission by network interface. Receive queue 808 can include data or references to data that was received by network interface from a network. Descriptor queues 820 can include descriptors that reference data or packets in transmit queue 806 or receive queue 808. Bus interface 812 can provide an interface with host device (not depicted). For example, bus interface 812 can be compatible with PCI, PCI Express, PCI-x, Serial ATA, and/or USB compatible interface (although other interconnection standards may be used).

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Figure 9:
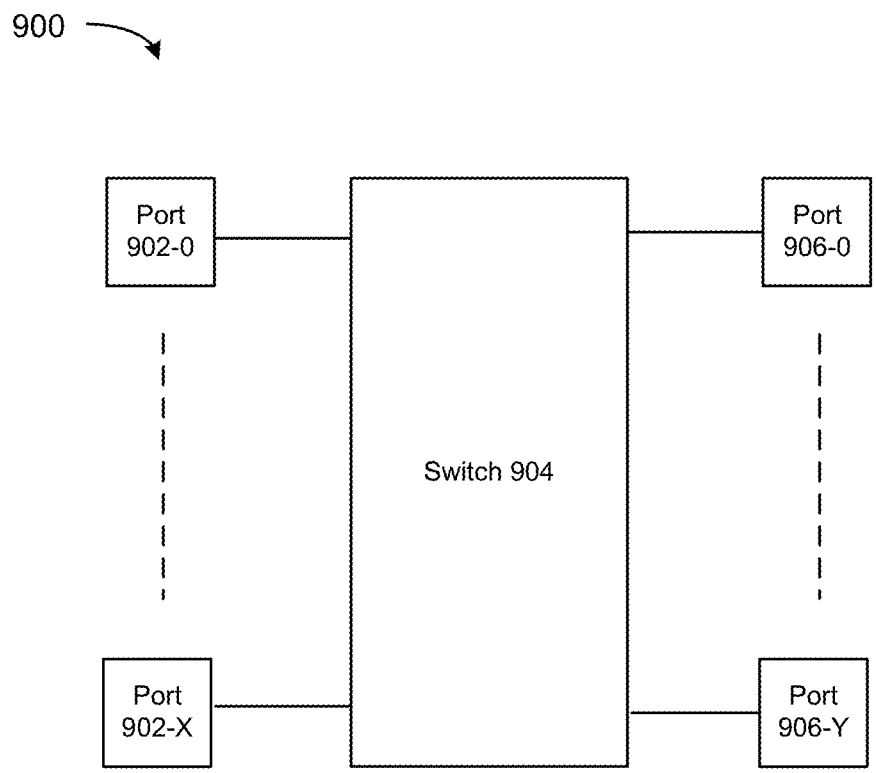
FIG. 9 depicts an example switch.

FIG. 9 depicts an example switch. Various embodiments can be used in or with the switch to perform link establishment, link training or link re-training in accordance with embodiments described herein. Switch 904 can route packets or frames of any format or in accordance with any specification from any port 902-0 to 902-X to any of ports 906-0 to 906-Y (or vice versa). Any of ports 902-0 to 902-X can be connected to a network of one or more interconnected devices. Similarly, any of ports 906-0 to 906-X can be connected to a network of one or more interconnected devices. Switch 904 can decide which port to transfer packets or frames to using a table that maps packet characteristics with an associated output port. For example, match-action tables can be used whereby a hash of a portion of a packet is used as an index to find an entry. In addition, switch 904 can perform packet replication for forwarding of a packet or frame to multiple ports and queuing of packets or frames prior to transfer to an output port. Some embodiments implement hash-lookup in P4 programming language, which is a programming language designed to allow programming of packet forwarding in data-planes. In contrast to general purpose language such as C or Python, P4 is domain-specific language with a number of constructs optimized around network data forwarding.

Figure 10:
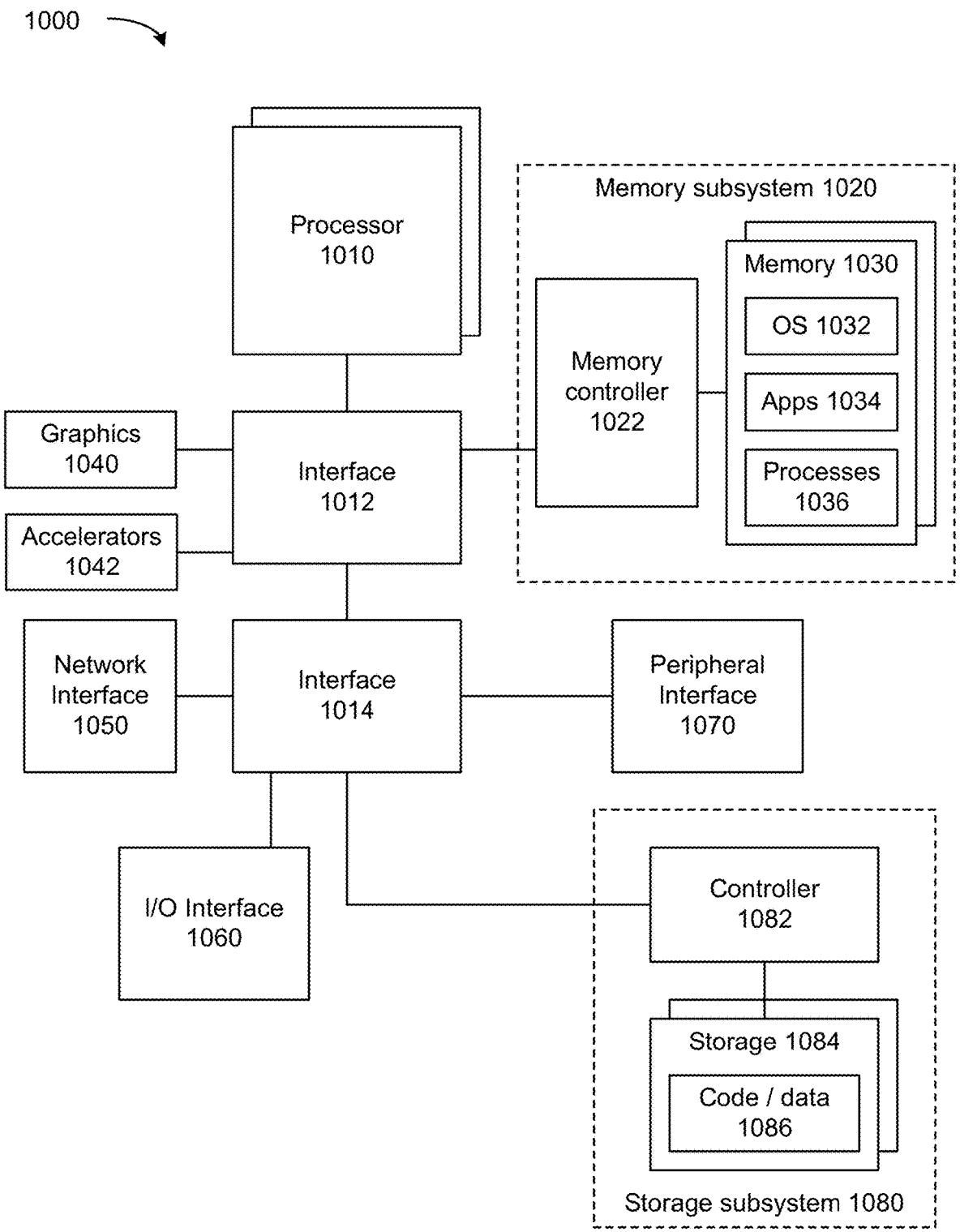
FIG. 10 depicts an example system.

FIG. 10 depicts a system. The system can use embodiments described herein to perform link establishment, link training or link re-training in accordance with embodiments described herein. System 1000 includes processor 1010, which provides processing, operation management, and execution of instructions for system 1000. Processor 1010 can include any type of microprocessor, central processing unit (CPU), graphics processing unit (GPU), processing core, or other processing hardware to provide processing for system 1000, or a combination of processors. Processor 1010 controls the overall operation of system 1000, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 1000 includes interface 1012 coupled to processor 1010, which can represent a higher speed interface or a high throughput interface for system components that needs higher bandwidth connections, such as memory subsystem 1020 or graphics interface components 1040, or accelerators 1042. Interface 1012 represents an interface circuit, which can be a standalone component or integrated onto a processor die. Where present, graphics interface 1040 interfaces to graphics components for providing a visual display to a user of system 1000. In one example, graphics interface 1040 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 1040 generates a display based on data stored in memory 1030 or based on operations executed by processor 1010 or both. In one example, graphics interface 1040 generates a display based on data stored in memory 1030 or based on operations executed by processor 1010 or both.

Accelerators 1042 can be a fixed function offload engine that can be accessed or used by a processor 1010. Accelerators 1042 can be coupled to processor 1010 using a memory interface (e.g., DDR4 and DDR5) or using any networking or connection standard described herein. For example, an accelerator among accelerators 1042 can provide sequential and speculative decoding operations in a manner described herein, compression (DC) capability, cryptography services such as public key encryption (PKE), cipher, hash/authentication capabilities, decryption, or other capabilities or services. In some embodiments, in addition or alternatively, an accelerator among accelerators 1042 provides field select controller capabilities as described herein. In some cases, accelerators 1042 can be integrated into a CPU socket (e.g., a connector to a motherboard or circuit board that includes a CPU and provides an electrical interface with the CPU). For example, accelerators 1042 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 1042 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 1020 represents the main memory of system 1000 and provides storage for code to be executed by processor 1010, or data values to be used in executing a routine. Memory subsystem 1020 can include one or more memory devices 1030 such as read-only memory (ROM), flash memory, one or more varieties of random access memory (RAM) such as DRAM, or other memory devices, or a combination of such devices. Memory 1030 stores and hosts, among other things, operating system (OS) 1032 to provide a software platform for execution of instructions in system 1000. Additionally, applications 1034 can execute on the software platform of OS 1032 from memory 1030. Applications 1034 represent programs that have their own operational logic to perform execution of one or more functions. Processes 1036 represent agents or routines that provide auxiliary functions to OS 1032 or one or more applications 1034 or a combination. OS 1032, applications 1034, and processes 1036 provide software logic to provide functions for system 1000. In one example, memory subsystem 1020 includes memory controller 1022, which is a memory controller to generate and issue commands to memory 1030. It will be understood that memory controller 1022 could be a physical part of processor 1010 or a physical part of interface 1012. For example, memory controller 1022 can be an integrated memory controller, integrated onto a circuit with processor 1010.

In some examples, processor 1010 can execute a device driver (not depicted) for network interface 1050. OS 1032 can determine capabilities of network interface 1050 from the device driver. For example, OS 1032 can receive an indication of capabilities of network interface 1050 to perform one or more of the following capabilities or capabilities described herein: link training time extension, commencing link training earlier than scheduled, changing or setting a default link training time, link re-training, or component parameter modification. OS 1032 can request the device driver to enable or disable network interface 1050 to perform any of the capabilities described herein. In some examples, OS 1032, itself, can enable or disable network interface 1050 to perform any of the capabilities described herein. OS 1032 can provide requests (e.g., from an application 1034) to network interface 1050 to utilize one or more capabilities of network interface 1050. For example, any of applications 1034 can request use or non-use of any capabilities described herein by network interface 1050. In some examples, a datacenter administrator can configure network interface 1050 to perform any of the capabilities described herein.

While not specifically illustrated, it will be understood that system 1000 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 1000 includes interface 1014, which can be coupled to interface 1012. In one example, interface 1014 represents an interface circuit, which can include standalone components and integrated circuitry. In one example, multiple user interface components or peripheral components, or both, couple to interface 1014. Network interface 1050 provides system 1000 the ability to communicate with remote devices (e.g., servers or other computing devices) over one or more networks. Network interface 1050 can include an Ethernet adapter, wireless interconnection components, cellular network interconnection components, USB (universal serial bus), or other wired or wireless standards-based or proprietary interfaces. Network interface 1050 can transmit data to a device that is in the same data center or rack or a remote device, which can include sending data stored in memory. Network interface 1050 can receive data from a remote device, which can include storing received data into memory. Various embodiments can be used in connection with network interface 1050, processor 1010, and memory subsystem 1020.

In one example, system 1000 includes one or more input/output (I/O) interface(s) 1060. I/O interface 1060 can include one or more interface components through which a user interacts with system 1000 (e.g., audio, alphanumeric, tactile/touch, or other interfacing). Peripheral interface 1070 can include any hardware interface not specifically mentioned above. Peripherals refer generally to devices that connect dependently to system 1000. A dependent connection is one where system 1000 provides the software platform or hardware platform or both on which operation executes, and with which a user interacts.

In one example, system 1000 includes storage subsystem 1080 to store data in a nonvolatile manner. In one example, in certain system implementations, at least certain components of storage 1080 can overlap with components of memory subsystem 1020. Storage subsystem 1080 includes storage device(s) 1084, which can be or include any conventional medium for storing large amounts of data in a nonvolatile manner, such as one or more magnetic, solid state, or optical based disks, or a combination. Storage 1084 holds code or instructions and data 1086 in a persistent state (e.g., the value is retained despite interruption of power to system 1000). Storage 1084 can be generically considered to be a "memory," although memory 1030 is typically the executing or operating memory to provide instructions to processor 1010. Whereas storage 1084 is nonvolatile, memory 1030 can include volatile memory (e.g., the value or state of the data is indeterminate if power is interrupted to system 1000). In one example, storage subsystem 1080 includes controller 1082 to interface with storage 1084. In one example controller 1082 is a physical part of interface 1014 or processor 1010 or can include circuits or logic in both processor 1010 and interface 1014.

A volatile memory is memory whose state (and therefore the data stored in it) is indeterminate if power is interrupted to the device. Dynamic volatile memory can involve refreshing the data stored in the device to maintain state. One example of dynamic volatile memory includes DRAM (Dynamic Random Access Memory), or some variant such as Synchronous DRAM (SDRAM). An example of a volatile memory includes a cache. A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 1000. More specifically, power source typically interfaces to one or multiple power supplies in system 1000 to provide power to the components of system 1000. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 1000 can be implemented using interconnected compute sleds of processors, memories, storages, network interfaces, and other components. High speed interconnects between components can be used such as: Ethernet (IEEE 802.3), remote direct memory access (RDMA), InfiniBand, Internet Wide Area RDMA Protocol (iWARP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade includes components common to conventional servers, including a main printed circuit board (main board) providing internal wiring (e.g., buses) for coupling appropriate integrated circuits (ICs) and other components mounted to the board.

Figure 11:
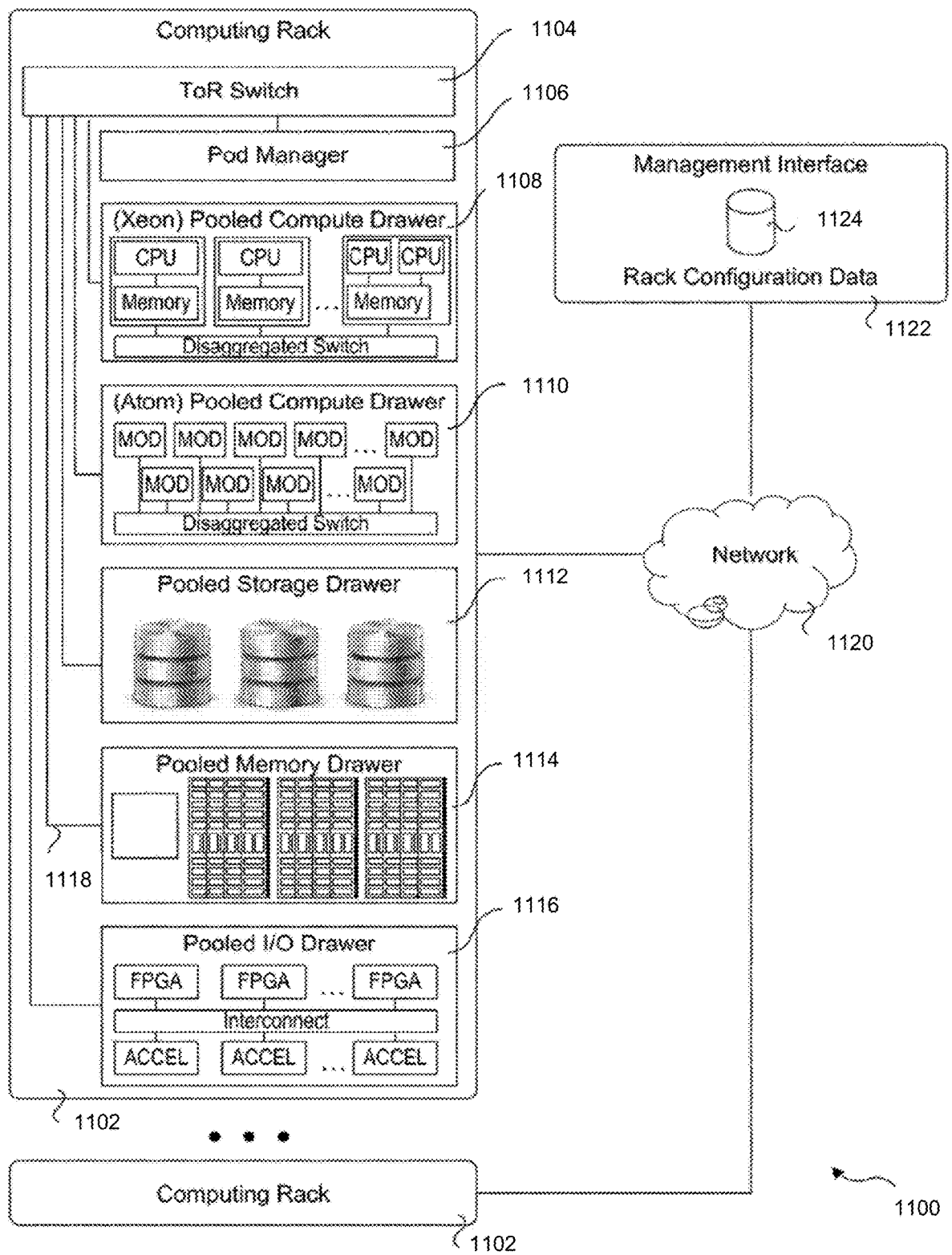
FIG. 11 depicts an environment.

FIG. 11 depicts an environment 1100 includes multiple computing racks 1102, some including a Top of Rack (ToR) switch 1104, a pod manager 1106, and a plurality of pooled system drawers. Various embodiments can be used in or with the switch to perform link establishment, link training or link re-training in accordance with embodiments described herein. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® XEON® pooled computer drawer 1108, and Intel® ATOM™ pooled compute drawer 1110, a pooled storage drawer 1112, a pooled memory drawer 1114, and a pooled I/O drawer 1116. Some of the pooled system drawers is connected to ToR switch 1104 via a high-speed link 1118, such as a 40 Gigabit/second (Gb/s) or 100 Gb/s Ethernet link or a 100+Gb/s Silicon Photonics (SiPh) optical link. In one embodiment high-speed link 1118 comprises an 800 Gb/s SiPh optical link.

Multiple of the computing racks 1102 may be interconnected via their ToR switches 1104 (e.g., to a pod-level switch or data center switch), as illustrated by connections to a network 1120. In some embodiments, groups of computing racks 1102 are managed as separate pods via pod manager(s) 1106. In one embodiment, a single pod manager is used to manage racks in the pod. Alternatively, distributed pod managers may be used for pod management operations.

Environment 1100 further includes a management interface 1122 that is used to manage various aspects of the environment. This includes managing rack configuration, with corresponding parameters stored as rack configuration data 1124.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," or "logic." A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, and so forth.

Example 1 includes an apparatus comprising: a first device associated with a lane of a communications link, wherein: the first device comprises a transmitter and receiver; the first device is to receive a first communication identifying capability to re-train a link; the first device is to transmit a second communication identifying one or more components and the second communication is to cause modification of one or more parameters of the one or more components; and the first device is to receive a third communication identifying a status of re-training.

Example 2 includes any example, wherein the one or more components comprise an equalizer and the one or more parameters comprise at least one tap setting.

Example 3 includes any example, wherein the one or more parameters comprises a precursor, main cursor or post-cursor equalizer setting.

Example 4 includes any example, wherein the first device is to: advertise one or more capabilities; receive one or more capabilities from the second device; and select an operating mode for a lane based on the advertised and received capabilities.

Example 5 includes any example, wherein the one or more capabilities comprise one or more of link speed, forward error correction (FEC) capabilities, or pause capability.

Example 6 includes any example, wherein the first communication comprises a setup message that identifies at least one tap capable of adjustment by link re-training and includes a local port identifier of a local port to be a subject of tap change requests by the first device.

Example 7 includes any example, wherein the second communication comprises a request message that comprises one or more of: a port identifier, lane identifier, identifier of one or more taps, change tap setting, or hold tap setting.

Example 8 includes any example, wherein the third communication comprises a response message that comprises one or more of: a port identifier, lane identifier, identifier of one or more taps, indication of updated, indication of not updated, indication of minimum reached, or indication of maximum reached.

Example 9 includes any example, wherein the first device is to commence link re-training in response to a change in power, voltage, or temperature or an elapsed time.

Example 10 includes any example, and includes one or more of: a server, rack, or data center and wherein the first device is provided in one or more of: the server, rack, or data center Example 11 includes any example, and includes a method to conduct link re-training, the method comprising: receiving, by a receiver in a first device, signals over a lane from a transmitter in a second device, the signals comprising a first communication identifying capability to re-train a link; transmitting, from the first device, a second communication including one or more components of a second device with capability to be adjusted and a request to modify one or more parameters of the one or more components; and receiving, at the first device, a third communication identifying a status of re-training.

Example 12 includes any example, wherein the one or more components comprise an equalizer and the one or more parameters comprises at least one tap setting.

Example 13 includes any example, wherein the one or more parameters comprise a precursor, main cursor or post-cursor equalization setting.

Example 14 includes any example, wherein the first communication comprises a setup message that identifies at least one tap capable of adjustment by link re-training and includes a local port identifier of a local port to be a subject of tap change requests by the first device.

Example 15 includes any example, wherein the second communication comprises a request message that comprises one or more of: a port identifier, lane identifier, identifier of one or more taps, change tap setting, or hold tap setting.

Example 16 includes any example, wherein the third communication comprises a response message that comprises one or more of: a port identifier, lane identifier, identifier of one or more taps, indication of updated, indication of not updated, indication of minimum reached, or indication of maximum reached.

Example 17 includes any example, and includes: training one lane at a time whereby the first device makes tap requests and adjusts its receiver, followed by a link partner of the first device starting link re-training for its receiver.

Example 18 includes any example, and includes: commencing link re-training in response to a change in power, voltage, or temperature or an elapsed time.

Example 19 includes any example, and includes a computer-readable medium comprising instructions stored thereon, that if executed by one or more processors, cause the one or more processors to: engage in a link re-training by: receiving, by a receiver in a first device, signals over a lane from a transmitter in a second device, the signals comprising a first communication identifying capability to re-train a link; transmitting, from the first device, a second communication including one or more components with capability to be adjusted and a request to modify one or more parameters of the one or more components; and receiving, at the first device, a third communication identifying a status of re-training.

Example 20 includes any example, wherein the one or more components comprise an equalizer and the one or more parameters comprises at least one tap setting.

Example 21 includes any example, wherein the first communication comprises a setup message that identifies at least one tap capable of adjustment by link re-training and includes a local port identifier of a local port to be a subject of tap change requests by the first device.

Example 22 includes any example, wherein the second communication comprises a request message that comprises one or more of: a port identifier, lane identifier, identifier of one or more taps, change tap setting, or hold tap setting.

What is claimed is:

1. An apparatus comprising:
   a first device associated with a lane of a communications link, wherein:
   the first device comprises a transmitter and receiver;
   the first device is to receive a first communication identifying capability to re-train a link;
   the first device is to transmit a second communication identifying one or more components and the second communication is to cause modification of one or more parameters of the one or more components; and
   the first device is to receive a third communication identifying a status of re-training.

2. The apparatus of claim 1, wherein the one or more components comprise an equalizer and the one or more parameters comprises at least one tap setting.

3. The apparatus of claim 1, wherein the one or more parameters comprises a precursor, main cursor or post-cursor equalizer setting.

4. The apparatus of claim 1, wherein the first device is to:
   advertise one or more capabilities;
   receive one or more capabilities from the second device; and
   select an operating mode for a lane based on the advertised and received capabilities.

5. The apparatus of claim 4, wherein the one or more capabilities comprise one or more of link speed, forward error correction (FEC) capabilities, or pause capability.

6. The apparatus of claim 1, wherein the first communication comprises a setup message that identifies at least one tap capable of adjustment by link re-training and includes a local port identifier of a local port to be a subject of tap change requests by the first device.

7. The apparatus of claim 1, wherein the second communication comprises a request message that comprises one or more of: a port identifier, lane identifier, identifier of one or more taps, change tap setting, or hold tap setting.

8. The apparatus of claim 1, wherein the third communication comprises a response message that comprises one or more of: a port identifier, lane identifier, identifier of one or more taps, indication of updated, indication of not updated, indication of minimum reached, or indication of maximum reached.

9. The apparatus of claim 1, wherein the first device is to commence link re-training in response to a change in power, voltage, or temperature or an elapsed time.

10. The apparatus of claim 1, comprising one or more of: a server, rack, or data center and wherein the first device is provided in one or more of: the server, rack, or data center.

11. A method to conduct link re-training, the method comprising:
   receiving, by a receiver in a first device, signals over a lane from a transmitter in a second device, the signals comprising a first communication identifying capability to re-train a link;
   transmitting, from the first device, a second communication including one or more components of a second device with capability to be adjusted and a request to modify one or more parameters of the one or more components; and
   receiving, at the first device, a third communication identifying a status of re-training.

12. The method of claim 11, wherein the one or more components comprise an equalizer and the one or more parameters comprises at least one tap setting.

13. The method of claim 11, wherein the one or more parameters comprise a precursor, main cursor or post-cursor equalization setting.

14. The method of claim 11, wherein the first communication comprises a setup message that identifies at least one tap capable of adjustment by link re-training and includes a local port identifier of a local port to be a subject of tap change requests by the first device.

15. The method of claim 11, wherein the second communication comprises a request message that comprises one or more of: a port identifier, lane identifier, identifier of one or more taps, change tap setting, or hold tap setting.

16. The method of claim 11, wherein the third communication comprises a response message that comprises one or more of: a port identifier, lane identifier, identifier of one or more taps, indication of updated, indication of not updated, indication of minimum reached, or indication of maximum reached.

17. The method of claim 11, comprising:
   training one lane at a time whereby the first device makes tap requests and adjusts its receiver, followed by a link partner of the first device starting link re-training for its receiver.

18. The method of claim 11, comprising:
   commencing link re-training in response to a change in power, voltage, or temperature or an elapsed time.

19. A non-transitory computer-readable medium comprising instructions stored thereon, that if executed by one or more processors, cause the one or more processors to:
   engage in a link re-training by:
   receiving, by a receiver in a first device, signals over a lane from a transmitter in a second device, the signals comprising a first communication identifying capability to re-train a link;
   transmitting, from the first device, a second communication including one or more components with capability to be adjusted and a request to modify one or more parameters of the one or more components; and
   receiving, at the first device, a third communication identifying a status of re-training.

20. The non-transitory computer-readable medium of claim 19, wherein the one or more components comprise an equalizer and the one or more parameters comprises at least one tap setting.

21. The non-transitory computer-readable medium of claim 19, wherein the first communication comprises a setup message that identifies at least one tap capable of adjustment by link re-training and includes a local port identifier of a local port to be a subject of tap change requests by the first device.

22. The non-transitory computer-readable medium of claim 19, wherein the second communication comprises a request message that comprises one or more of: a port identifier, lane identifier, identifier of one or more taps, change tap setting, or hold tap setting.

* * * * *